(12) United States Patent
Chu et al.

(10) Patent No.: US 8,369,257 B2
(45) Date of Patent: Feb. 5, 2013

(54) RELIABLE AND DETERMINISTIC COMMUNICATION PROTOCOL

(75) Inventors: Liwen Chu, San Ramon, CA (US); George A. Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 809 days.

(21) Appl. No.: 12/494,776

(22) Filed: Jun. 30, 2009

(65) Prior Publication Data

US 2010/0165907 A1 Jul. 1, 2010

Related U.S. Application Data

(60) Provisional application No. 61/142,152, filed on Dec. 31, 2008, provisional application No. 61/149,282, filed on Feb. 2, 2009.

(51) Int. Cl.
- *H04H 20/71* (2008.01)
- *H04B 7/212* (2006.01)
- *H04B 7/00* (2006.01)
- *H04L 12/413* (2006.01)

(52) U.S. Cl. ........ 370/312; 370/322; 370/348; 370/443; 370/445; 370/447; 370/329; 370/462; 370/469; 370/230; 455/41.2

(58) Field of Classification Search ........... 370/228–463
See application file for complete search history.

(56) References Cited

U.S. PATENT DOCUMENTS

| | | | |
|---|---|---|---|
| 6,839,331 B2 * | 1/2005 | Rudnick | 370/312 |
| 6,917,598 B1 * | 7/2005 | Emeott et al. | 370/311 |
| 7,180,905 B2 * | 2/2007 | Benveniste | 370/445 |
| 7,272,119 B2 * | 9/2007 | Rudnick et al. | 370/329 |
| 7,646,758 B2 | 1/2010 | Benveniste | |
| 7,656,831 B2 * | 2/2010 | Gao et al. | 370/311 |
| 7,746,879 B2 * | 6/2010 | Kangude et al. | 370/406 |
| 7,773,625 B2 * | 8/2010 | Benveniste | 370/445 |
| 7,801,099 B2 * | 9/2010 | Desai | 370/338 |
| 7,826,411 B2 * | 11/2010 | Gonikberg et al. | 370/328 |
| 7,864,720 B2 * | 1/2011 | Jeyaseelan | 370/311 |
| 7,873,049 B2 * | 1/2011 | Gaur et al. | 370/392 |
| 7,881,746 B2 * | 2/2011 | Desai | 455/552.1 |
| 7,903,607 B2 * | 3/2011 | Utsunomiya et al. | 370/329 |
| 7,995,543 B2 * | 8/2011 | Ho et al. | 370/338 |
| 8,041,319 B2 * | 10/2011 | He et al. | 455/144 |
| 8,045,922 B2 * | 10/2011 | Sherman et al. | 455/41.2 |
| 8,248,929 B2 * | 8/2012 | Sato et al. | 370/230 |
| 2002/0131371 A1 * | 9/2002 | Rudnick | 370/252 |
| 2002/0159418 A1 * | 10/2002 | Rudnick et al. | 370/338 |
| 2002/0163928 A1 * | 11/2002 | Rudnick et al. | 370/444 |
| 2003/0174665 A1 * | 9/2003 | Benveniste | 370/317 |
| 2004/0136339 A1 * | 7/2004 | Wentink | 370/329 |

(Continued)

*Primary Examiner* — Ayaz Sheikh
*Assistant Examiner* — Venkatesh Haliyur
(74) *Attorney, Agent, or Firm* — Seed IP Law Group PLLC

(57) ABSTRACT

A reliable and deterministic video communication protocol is provided. In one aspect, a method of transmitting data, audio or video frames in a basic service set having a plurality of stations in a wireless local area network transmits a transmit opportunity information element to reserve a transmit opportunity time interval. The method further transmits the data, audio or video frames to a number of the stations in the basic service set during the reserved transmit opportunity time interval. In another aspect, a method of transmitting data, audio or video frames in a basic service set having a plurality of stations in a wireless local area network first transmits protection frames to reserve a time interval, then transmits frames during the reserved time interval or during a non-reserved time interval. In yet another aspect, a method of transmitting data, audio or video frames in a basic service set having a plurality of stations in a wireless local area network utilizes acknowledgement frames from the plurality of stations to acknowledge the transmission. A wireless communication device is also provided.

17 Claims, 26 Drawing Sheets

U.S. PATENT DOCUMENTS

| | | | |
|---|---|---|---|
| 2005/0135284 A1* | 6/2005 | Nanda et al. | 370/294 |
| 2005/0135295 A1* | 6/2005 | Walton et al. | 370/328 |
| 2005/0135318 A1* | 6/2005 | Walton et al. | 370/338 |
| 2005/0136833 A1* | 6/2005 | Emeott et al. | 455/11.1 |
| 2005/0138451 A1* | 6/2005 | Simpson et al. | 713/320 |
| 2006/0285527 A1* | 12/2006 | Gao et al. | 370/338 |
| 2007/0060141 A1* | 3/2007 | Kangude et al. | 455/445 |
| 2007/0133447 A1* | 6/2007 | Wentink | 370/310 |
| 2007/0211749 A1* | 9/2007 | Benveniste | 370/445 |
| 2007/0258397 A1* | 11/2007 | Ho et al. | 370/328 |
| 2007/0297438 A1* | 12/2007 | Meylan et al. | 370/445 |
| 2008/0049703 A1* | 2/2008 | Kneckt et al. | 370/342 |
| 2008/0089268 A1* | 4/2008 | Kinder et al. | 370/315 |
| 2008/0151849 A1* | 6/2008 | Utsunomiya et al. | 370/338 |
| 2008/0181154 A1* | 7/2008 | Sherman | 370/311 |
| 2008/0225811 A1* | 9/2008 | Wentink | 370/338 |
| 2008/0259846 A1* | 10/2008 | Gonikberg et al. | 370/328 |
| 2008/0279138 A1* | 11/2008 | Gonikberg et al. | 370/328 |
| 2008/0279162 A1* | 11/2008 | Desai | 370/338 |
| 2008/0279163 A1* | 11/2008 | Desai | 370/338 |
| 2008/0279264 A1* | 11/2008 | Desai et al. | 375/220 |
| 2008/0298289 A1* | 12/2008 | Jeyaseelan | 370/311 |
| 2009/0034498 A1* | 2/2009 | Banerjea et al. | 370/338 |
| 2009/0137206 A1* | 5/2009 | Sherman et al. | 455/41.2 |
| 2010/0008338 A1* | 1/2010 | Tsfati et al. | 370/338 |
| 2010/0165907 A1* | 7/2010 | Chu et al. | 370/312 |
| 2010/0229037 A1* | 9/2010 | Sato et al. | 714/27 |
| 2010/0284380 A1 | 11/2010 | Banerjee et al. | |
| 2011/0080977 A1 | 4/2011 | Liu et al. | |

* cited by examiner

MBBA = Multicast/Broadcast Block Acknowledgement

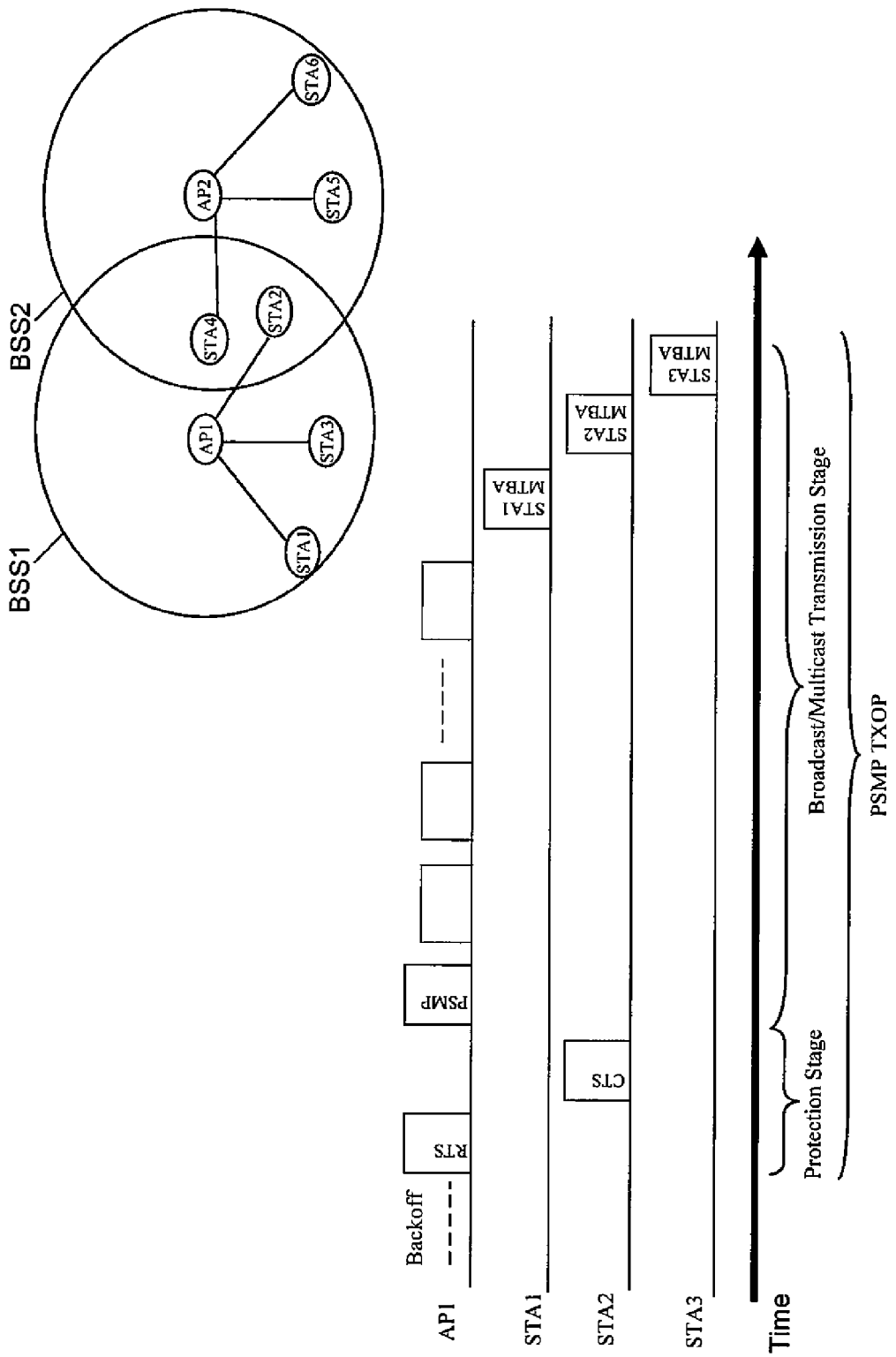

RELIABLE AND DETERMINISTIC COMMUNICATION PROTOCOL

CROSS-REFERENCE TO RELATED APPLICATION

This application claims the benefit under 35 U.S.C. §119 (e) of U.S. Provisional Patent Application Ser. No. 61/142,152, filed Dec. 31, 2008, entitled "Reliable and Deterministic Video Communication Protocol," and U.S. Provisional Patent Application Ser. No. 61/149,282, filed Feb. 2, 2009, entitled "Multicast/Broadcast Communications with Ack", which are incorporated herein by reference in their entirety.

BACKGROUND

1. Technical Field

This disclosure generally relates to the field of transmission of audio and video streams in wireless local area network (WLAN) communications and, more particularly, to quality of service for multicast and broadcast of audio/video streams in WLAN communications.

2. Description of the Related Art

In recent years, wireless computer networks such as WLANs have been widely deployed in places ranging from homes and businesses to hotels, airports, schools, etc. Compared to wire networks, a WLAN provides users mobile connectivity and are typically more scalable and require lower cost in network construction. With the popularity of multimedia applications like streaming multimedia and voice over IP on the rise, it is important to ensure quality of service in the delivery of time-sensitive multimedia content in a WLAN.

Within the IEEE 802.11 WLAN standards, the IEEE 802.11e is an approved amendment that defines a set of quality of service enhancements for WLAN applications through modification to the media access control (MAC) layer. Specifically, the IEEE 802.11e defines two access protocols at the MAC layer: the mandatory distributed coordination function (DCF) and the optional point coordination function (PCF).

The DCF protocol uses a carrier sense multiple access with collision avoidance (CSMA/CA) method to decide which station in the WLAN should send packets out. The DCF protocol also has an optional virtual carrier sense mechanism that exchanges short request-to-send (RTS) and clear-to-send (CTS) frames between source and destination stations during the intervals between the data frame transmissions.

Under the DCF protocol, the WLAN stations listen to the wireless medium to determine when it is free, or idle. Once a station detects that the medium is idle, the station begins to decrement its back-off counter. Each station maintains a contention window (CW) that is used to determine the number of slot times a station has to wait before transmission. The back-off counter only begins to decrement after the medium has been idle for a DCF inter-frame space (DIFS) period. If the back-off counter expires and the medium is still idle, the station begins to transmit. Thus, it is possible that two stations may begin to transmit at the same time, in which case a collision occurs. If a frame is successfully received by the destination the frame is addressed to, the destination sends an acknowledgement (ACK) frame to notify the source of the successful reception. However, as there is no centralized coordination in DCF, a relatively high number of collisions still occur especially in a WLAN with high load.

In an infrastructure basic service set, typically including an access point and associated non-access point stations, centralized coordination can be achieved when using the PCF protocol as PCF requires the access point to poll the stations to coordinate access to the wireless medium. However, the PCF protocol is rarely implemented as the implementation is complicated because AP has to poll the non-access point stations for the transmission of each polled packet. Additionally, it is difficult to integrate an effective power saving mode with PCF.

The IEEE 802.11e enhances the DCF and PCF protocols through the hybrid coordination function (HCF). The HCF includes two protocols of channel access: enhanced distributed channel access (EDCA) and HCF controlled channel access (HCCA). As the HCCA protocol uses contention free periods to transmit data streams, it makes efficient use of the bandwidth. However, implementation of HCCA tends to require a relatively complex scheduler and added complexity. With the EDCA protocol, data streams are assigned different priorities and thus high-priority data streams have a higher chance of being transmitted than low-priority data streams. Each priority level is assigned a transmit opportunity (TXOP), which is a time interval during which a station in the WLAN can send as many frames as possible.

Audio and video streams require reliable transmission and deterministic delay. At current time it is difficult, however, to provide reliable audio/video transmission in an IEEE 802.11-based WLAN because of insufficient support of broadcast and multicast transmissions. For example, an intra-basic service set collision occurs if associated stations transmit frames when the access point is transmitting broadcast or multicast frames. When two or more basic service sets overlap each other, an overlapping basic service set (OBSS) or inter-basic service set collision may occur. The collision may happen, for example, if a station or the access point of a first basic service set transmits frames when an access point of a second basic service set that overlaps the first basic service set is transmitting broadcast/multicast frames. Furthermore, there is no feedback mechanism to indicate the correct reception of the broadcast/multicast frames transmitted by the access point.

In addition, the EDCA protocol, as it stands, does not provide deterministic delay. Although there are efforts made to include a reservation-based medium access method in the IEEE 802.11n and 802.11s drafts, a number of issues still need to be addressed in order to provide reliable reserved medium access for transmission of audio/video streams. For example, issues related to coexistence with legacy overlapping basic service set and coexistence with or without overlapping basic service set should be considered.

BRIEF SUMMARY

A method of transmitting data, audio or video frames in a basic service set having a plurality of stations in a wireless local area network may be summarized as including transmitting a transmit opportunity information element to reserve a transmit opportunity time interval; and transmitting the data, audio or video frames to a number of the stations in the basic service set during the reserved transmit opportunity time interval. In one embodiment, transmitting the transmit opportunity information element may include transmitting at least one of an active indication to indicate whether or not the transmit opportunity is currently enabled, an activation start time to indicate a time when the transmit opportunity will be enabled if the transmit opportunity is not currently enabled, a transmit opportunity type, a source address, a destination address, a service interval, an offset to the service interval, and a duration of the transmit opportunity. In an alternative embodiment, transmitting the transmit opportunity information element may include broadcasting the transmit opportunity information element using a delivery traffic indication message (DTIM) beacon to the stations in the basic service set.

A method of transmitting data, audio or video frames in a basic service set having a plurality of stations in the presence of an overlapping basic service set in a wireless local area network may be summarized as including optionally transmitting a transmit opportunity information element to reserve a transmit opportunity time interval; transmitting a protection frame during the reserved transmit opportunity time interval or a non-reserved transmit opportunity time interval to cause at least one station in the overlapping basic service set to refrain from transmission during a protection duration within the reserved transmit opportunity time interval or the non-reserved transmit opportunity time interval; and transmitting the data, audio or video frames during the protection duration within the reserved transmit opportunity time interval or the non-reserved transmit opportunity time interval. In one embodiment, transmitting the protection frame may include broadcasting a control frame that includes a duration field set to the protection duration. In one embodiment, transmitting the protection frame during the reserved transmit opportunity time interval or the non-reserved transmit opportunity time interval to cause at least one station in the overlapping basic service set to refrain from transmission during a protection duration within the reserved transmit opportunity time interval or the non-reserved transmit opportunity time interval may include assigning a first station in the basic service set to transmit the protection frame, the first station being within a transmission range of the overlapping basic service set; and broadcasting the protection frame that includes a protection duration from the first station to cause the at least one station in the overlapping basic service set to set a network allocation vector according to the IEEE 802.11 standards for the protection duration. The method may further include detecting more than one collided frames transmitted during the reserved transmit opportunity time interval; and transmitting a new transmit opportunity information element to reserve a new transmit opportunity time interval for retransmission of the collided frames.

A method of transmitting data, audio or video frames in a basic service set having an access point and a plurality of stations with or without the presence of an overlapping basic service set in a wireless local area network may be summarized as including selecting a first number of the stations in the basic service set to provide acknowledgement; transmitting a plurality of data, audio or video frames to a second number of the stations in the basic service set, the second number being equal to or greater than the first number; transmitting a block acknowledgement request after transmitting the plurality of data, audio or video frames; and receiving acknowledgement frames from the first number of the stations after transmitting the plurality of data, audio or video frames. In one embodiment, transmitting the block acknowledgement request may include transmitting a multicast or broadcast block acknowledgement request from the access point to the first number of the stations to request each of the first number of the stations to respond with a respective acknowledgement frame. The multicast or broadcast block acknowledgement request may include a respective identifier of each of the first number of the stations, a respective offset for each of the first number of the stations to transmit the respective acknowledgement frame at a time from a reference time by the respective offset, and a duration for transmission of the respective acknowledgement frame. In an alternative embodiment, transmitting the block acknowledgement request may include setting a reserved field in a block acknowledgement frame based on the IEEE 802.11 standards to indicate the block acknowledgement frame as being a multicast or broadcast block acknowledgement frame; and transmitting the block acknowledgement from the access point to the first number of the stations.

In one embodiment, the method may further include transmitting a request to a first station in the basic service set that is within a transmission range of the overlapping basic service set, the request indicating a transmission duration during which the data, audio or video frames are transmitted before transmitting the data, audio or video frames; and receiving a response from the first station that causes at least one station in the overlapping basic service set to refrain from transmission during the transmission duration before transmitting the data, audio or video frames. In one embodiment, the request may include a request-to-send frame, and wherein the response may include a clear-to-send frame. In an alternative embodiment, the request may include a multicast or broadcast block acknowledgement request frame, and wherein the response may include a multicast or broadcast block acknowledgement frame.

A method of transmitting data, audio or video frames in a basic service set having a plurality of stations in the presence of an overlapping basic service set in a wireless local area network may be summarized as including transmitting a first request to a first station in the basic service set that is within a transmission range of the overlapping basic service set, the first request indicating a transmission duration during which a plurality of data, audio or video frames will be transmitted; receiving a response to the first request from the first station; transmitting the data, audio or video frames to a first number of the stations in the basic service set; and receiving a respective acknowledgement from each of a second number of the stations after transmitting the data, audio or video frames, the first number being equal to or greater than the second number. In one embodiment, the first request may include a request-to-send frame, and the response may include a clear-to-send frame. In one embodiment, the method may further include transmitting a second request to the second number of the stations in the basic service set before transmitting the data, audio or video frames and after receiving the response from the first station to cause the second number of the stations to acknowledge receipt of the data, audio or video frames, the second request including a power save multi-poll frame.

A method of transmitting data, audio or video frames in a basic service set having a plurality of stations in a wireless local area network may be summarized as including transmitting a first frame having a first sequence number to a subset of stations of the plurality of stations that are in a broadcast or multicast group; transmitting a second frame having a second sequence number that is different than the first sequence number to at least the subset of stations that are in the broadcast or multicast group; setting a buffer sequence number in the subset of stations that are in the broadcast or multicast group to a third sequence number that is different from the first sequence number; and transmitting a third frame having the third sequence number to the subset of stations of the plurality of stations. In one embodiment, setting a buffer sequence number in the subset of stations that are in the broadcast or multicast group to a third sequence number may include transmitting one of a block acknowledgement request frame, a multicast or broadcast block acknowledgement frame, and a multiple traffic block acknowledgement frame to the subset of stations in the broadcast or multicast group to set the buffer sequence number in the subset of stations to the third sequence number.

A circuit in a wireless communication device may be summarized as including a medium access module that may be configured to cause a transmit opportunity information element to be transmitted to reserve a transmit opportunity time interval for transmission of data, audio or video frames, and to cause the data, audio or video frames to be transmitted during the reserved transmit opportunity time interval. In one embodiment, the medium access module may be configured to cause a protection frame to be transmitted to indicate a protection duration within the reserved transmit opportunity time interval to cause at least one other wireless communication device to refrain from transmission during the protection duration, and wherein the medium access module is further configured to cause the data, audio or video frames to be transmitted during the protection duration.

BRIEF DESCRIPTION OF THE SEVERAL VIEWS OF THE DRAWINGS

FIG. 10B is a timing diagram illustrating protected transmission of data, audio or video frames with block acknowledgement and power save multi-poll in a reserved TXOP or non-reserved TXOP according to another embodiment.

DETAILED DESCRIPTION

In the description provided hereinafter, certain specific details are set forth in order to provide a thorough understanding of various disclosed embodiments. However, one skilled in the relevant art will recognize that embodiments may be practiced without one or more of these specific details, or with other methods, components, etc. In other instances, well-known structures and protocols associated with WLAN communications have not been shown or described in detail to avoid unnecessarily obscuring descriptions of the embodiments.

As used herein, the term "broadcast" generally refers to transmission of wireless signals to one or more unspecified devices capable of receiving wireless signals. The term "broadcast" may further refer to wireless transmission of data, audio, and/or video packets from an access point of a basic service set to all stations of the basic service set in the context of a local area network such as a WLAN.

As used herein, the term "multicast" generally refers to transmission of wireless signals to a plurality of specified destinations or devices capable of receiving wireless signals. The term "multicast" may further refer to wireless transmission of data, audio, and/or video packets from an access point of a basic service set to a subset of the stations of the basic service set in the context of a local area network such as a WLAN.

As used herein, the term "unicast" generally refers to transmission of wireless signals to a specified destination or device capable of receiving wireless signals. The term "unicast" may further refer to wireless transmission of data, audio, and/or video packets from an access point of a basic service set to one of the stations of the basic service set in the context of a local area network such as a WLAN.

As used herein, the term "transmission" generally refers to transmission of wireless signals to any number of devices capable of receiving wireless signals via broadcast, multicast or unicast. The term "transmission" may further refer to wireless transmission of data, audio, and/or video packets from an access point of a basic service set to any number of the stations and access points in a basic service set and any overlapping basic service set in the context of a local area network such as a WLAN.

Figure 1B:
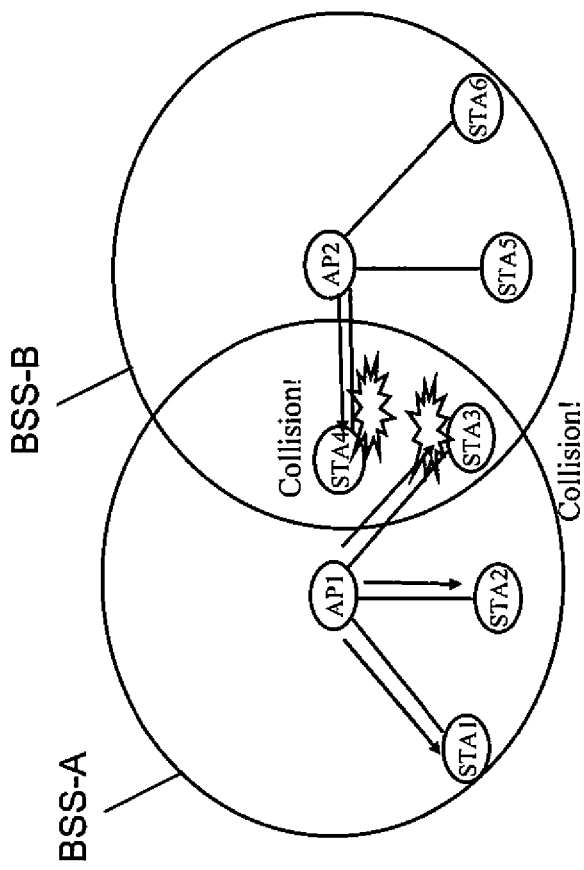
FIGS. 1A and 1B are simplified diagrams illustrating intra-BSS collision and inter-BSS collision using conventional broadcast or unicast methods.
Figure 1A:
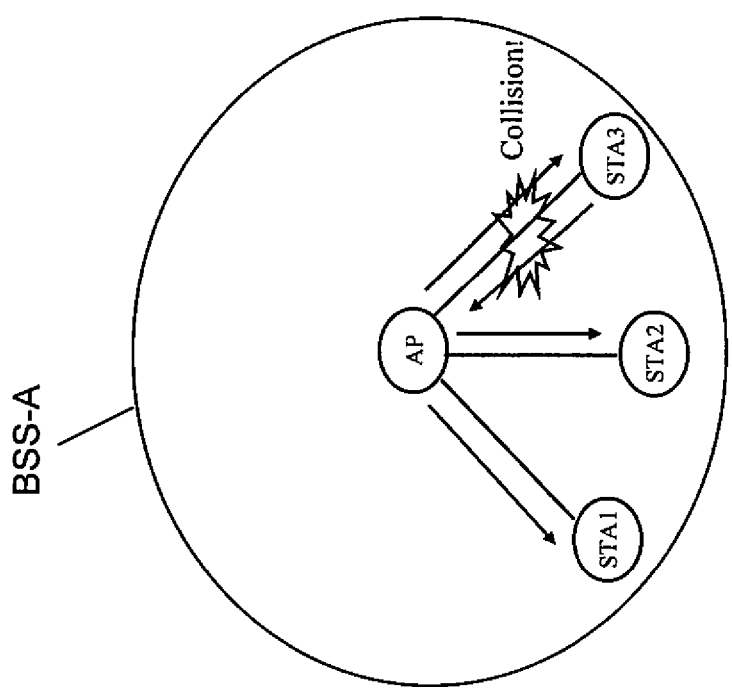

FIG. 1 illustrates intra-basic service set collision and inter-basic service set collision using conventional broadcast or multicast methods. An intra-basic service set collision can occur when one or more stations in the basic service set transmits frames when the access point is transmitting broadcast or multicast frames to some or all the stations in the basic service set. As shown in FIG. 1A, for example, an intra-basic service set collision occurs when station STA3 transmit frames while access point AP is transmitting broadcast or multicast frames to some or all the stations in the basic service set BSS-A. An inter-basic service set collision can occur when an access point transmits broadcast or multicast frames while one or more stations, or the access point, of an overlapping basic service set transmit frames. As shown in FIG. 1B, for example, an inter-basic service set collision (or overlapping basic service set collision) occurs when the access point AP1 of the basic service set BSS-A transmits broadcast or multicast frames while the access point AP2 of the basic service set BSS-B is transmitting frames to station STA4 of the basic service set BSS-B. Another shortcoming of the structure of FIG. 1 is that, as there is no feedback required to indicate the correct reception of the broadcast/multicast frames, the conventional scheme of broadcast and multicast of data, audio or video frames is unreliable.

To provide reliable broadcast and multicast transmission of data, audio or video frames, one approach is to decrease the probability of transmission collisions. Another approach is to provide feedback, such as acknowledgement, in response to receipt of data, audio or video frames transmitted via broadcast or multicast.

Figure 2:
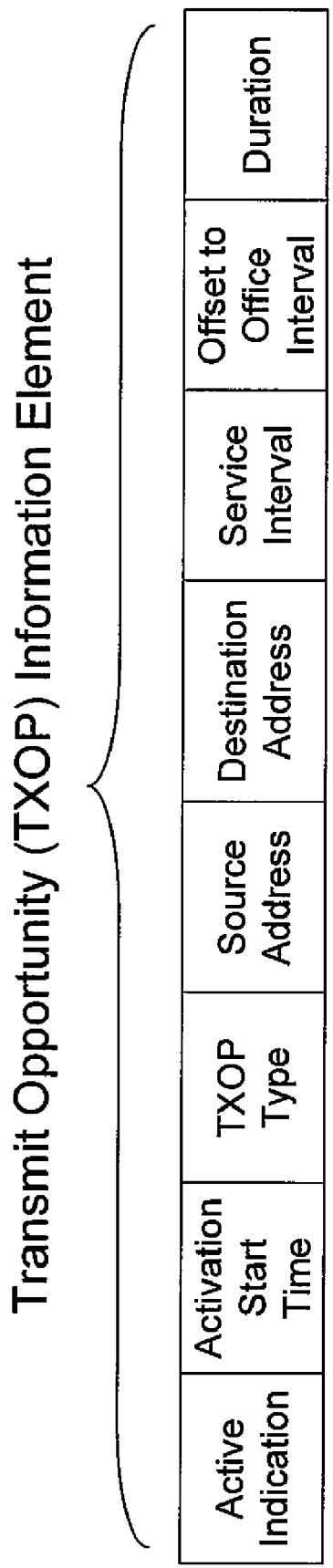
FIG. 2 is a simplified diagram illustrating a TXOP information element according to one embodiment.

FIG. 2 illustrates a TXOP information element according to one embodiment. In an inventive reservation-based medium access scheme to decrease the probability of transmission collisions, a TXOP information element, which is a set of information, is used to reserve a TXOP time interval. It is believed that reliable transmission and deterministic delay can be achieved by transmission of high-priority frames such as audio and video frames during the reserved TXOP time interval. The reservation of a TXOP time interval is made known by transmission, such as broadcast or multicast, of the TXOP information element to stations in a basic service set. In one embodiment, the access point of a basic service set transmits a TXOP information element to a number of stations in the basic service set to reserve a TXOP time interval for transmission of data, audio or video frames. For example, the access point may broadcast the TXOP information element to all stations in the basic service set to reserve a time interval for transmission of data, audio or video frames to avoid intra-basic service set collisions during the transmission of the data, audio or video frames. Each station, upon being notified of the reserved TXOP time interval, will refrain from transmission during the reserved TXOP time interval. For instance, each station informed of the reserved TXOP time interval will set its network allocation vector (NAV) to refrain from transmission during the reserved TXOP time interval in accordance with the IEEE 802.11 standards.

As shown in FIG. 2, a TXOP information element includes the following fields: an active indication field, an activation start time field, a TXOP type field, a source address field, a destination address field, a service interval field, an offset to service interval field, and a duration field. Alternatively, a TXOP information element may include fewer or more of the fields listed above. In one embodiment, a TXOP information element includes the information needed to reserve one TXOP time interval for transmission of data, audio or video frames during one service interval. A service interval is a period of time sufficiently long to include one or more TXOP time intervals for an access point to transmit data, audio, or video frames, whether by broadcast, multicast, and/or unicast. Alternatively, a TXOP information element may include the information needed to reserve more than one TXOP time intervals.

In one embodiment, the active indication field is set to a first value if and only if the TXOP is currently enabled, and set to a second value if the TXOP is not currently enabled. The activation start time field indicates when the TXOP will be enabled if the active indication is set to the second value indicating the TXOP is not currently enabled. In some embodiments, several transmissions of the TXOP information element with the active indication field set to the second value may be needed in order to ensure all stations in the basic service set have been notified of an imminent TXOP. The TXOP type field indicates whether the TXOP is a one-stage TXOP or a two-stage TXOP. For example, when there is no overlapping basic service set detected, a TXOP will be of the one-stage type as will be described in more detail below. Conversely, if at least one overlapping basic service set is present, the TXOP will be of the two-stage type as will be described in more detail below.

The duration field indicates the length of the reserved TXOP time interval. Under the reservation-based medium access scheme, it is during the reserved TXOP time interval that data, audio or video frames are transmitted to avoid collisions. The source address field indicates the address of the access point for broadcast and multicast transmission in one embodiment. Alternatively, the source address field may indicate the owner of the reserved TXOP, which may be the access point. The destination address field indicates the address or addresses of the intended recipient or recipients of the video frames. For a broadcast transmission, the destination address field indicates the addresses of all the stations in the basic service set. For a multicast transmission, the destination address field indicates the addresses of those stations in the BSS the multicast transmission is directed to. For a unicast transmission, the destination address field indicates the address of the station in the basic service set the unicast transmission is directed to. The service interval field indicates the length of the service interval specific to the access point, and the length may differ from access point to access point. The offset to service interval field indicates an offset between the beginning of transmission of the data, audio or video frames and the beginning of the respective service interval, and the offset may be adjusted according to the traffic on the transmission medium.

Figure 3:
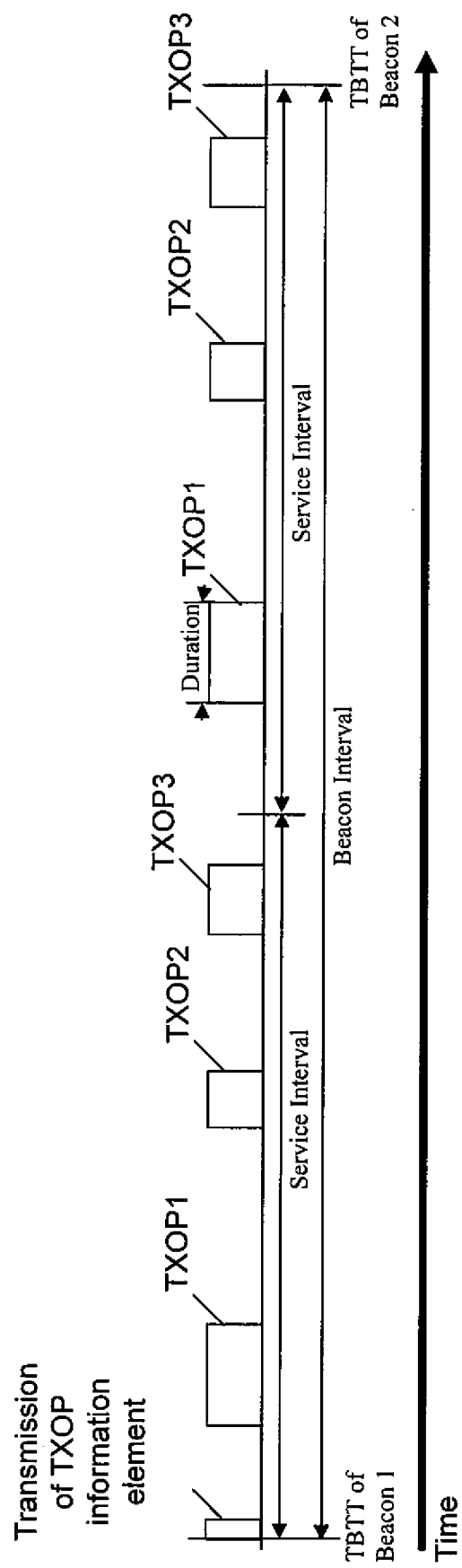
FIG. 3 is a timing diagram illustrating the relationship between the transmission of TXOP information element and the reserved TXOP time intervals according to one embodiment.

FIG. 3 illustrates the relationship between the transmission of TXOP information element and the reserved TXOP time intervals according to one embodiment. A TXOP information element is periodically broadcasted by the access point to the stations in a basic service set in a beacon to reserve one or more TXOP time intervals in a given service interval. In another embodiment, the TXOP information element is broadcasted in an action frame such as a management frame to the stations in the basic service set. The reservation of TXOP time intervals is one method believed to result in reliable transmission of data, audio or video frames during the reserved TXOP time intervals and deterministic delay.

When there are a number of service intervals between two adjacent beacons broadcasted by the access point, the TXOP information element is used to reserve one or more TXOP time intervals during each of the number of the service intervals between two beacons. For example, as shown in FIG. 3, the TXOP information element broadcasted in beacon 1 reserves the different TXOP time intervals TXOP1, TXOP2, and TXOP3. As there are two service intervals between beacon 1 and beacon 2, the TXOP information element broadcasted in beacon 1 reserves the TXOP time intervals TXOP1, TXOP2, and TXOP3 for both of the service intervals. The TXOP time intervals TXOP1, TXOP2, and TXOP3 may have varying duration depending on the bandwidth requirements. If more data, audio or video frames need to be transmitted after the two service intervals, another TXOP information element will be broadcasted in beacon 2 to reserve more TXOP time intervals in the subsequent service intervals.

An access point reserves TXOP time intervals according to service requirements from the upper layers above the access point's MAC layer or according to service requirements from the stations associated with the access point. Scheduling of the TXOP time intervals depends on the implementation.

Figure 4:
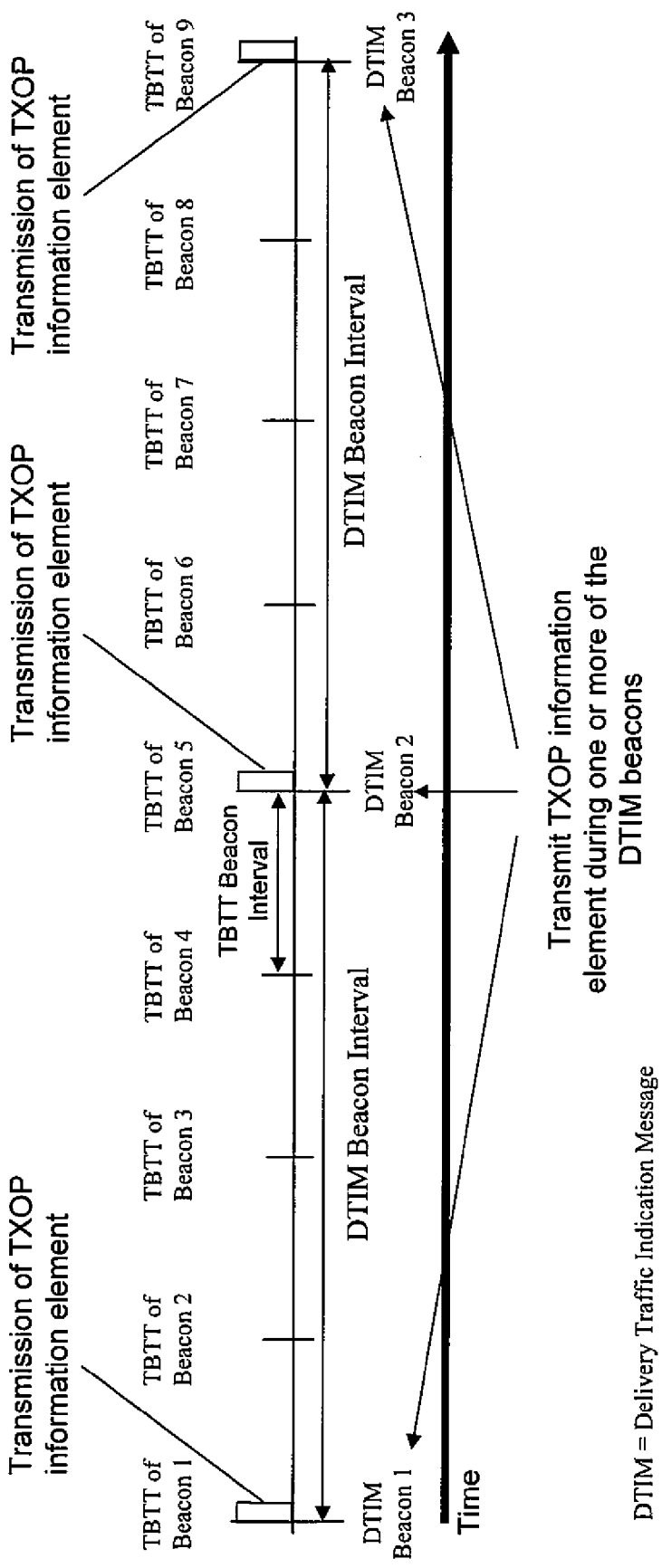
FIG. 4 is a timing diagram illustrating time spots for transmission of a TXOP information element according to one embodiment.

FIG. 4 illustrates the time spots for transmission of a TXOP information element according to one embodiment. The access point should ensure that all stations associated with it receive the TXOP information element. To do so, in one embodiment the access point periodically broadcasts the TXOP information element in one or more beacons plus one or more broadcast TXOP reservation action frames. In case one or more stations in the basic service set are in power saving mode, the access point may periodically broadcast the reserved video TXOP information element in one or more DTIM beacons, as shown in FIG. 4, to ensure that all stations receive the reserved video TXOP information element. In such case, the broadcasted TXOP information element contains the necessary information for reservation of one or more TXOP time intervals for the service intervals between two adjacent DTIM beacons. Alternatively, the TXOP information element may be periodically broadcasted in beacons at one or more target beacon transmission times in addition to being broadcasted in DTIM beacons.

Figure 5:
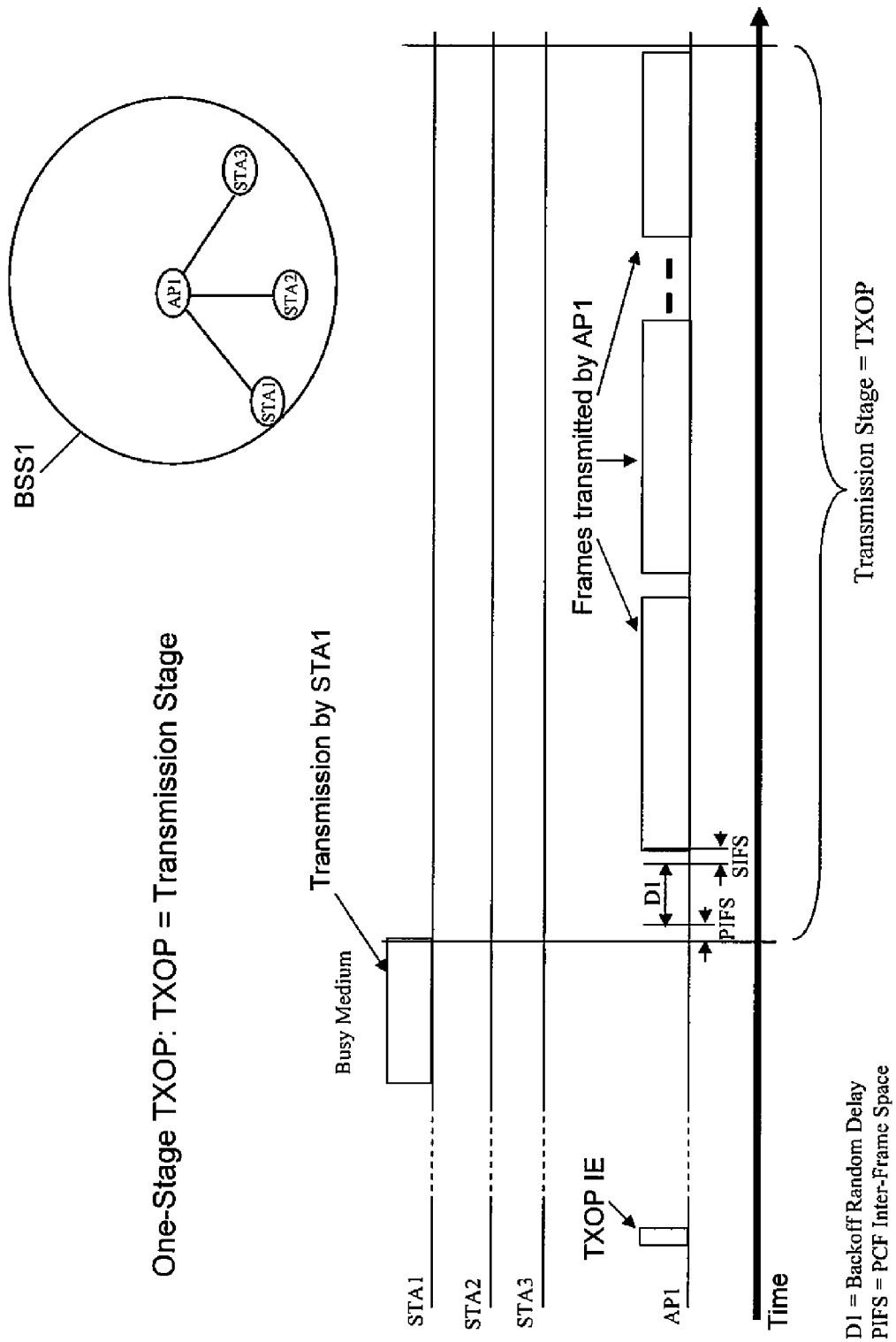
FIG. 5 is a timing diagram illustrating transmission of data, audio or video frames during a one-stage TXOP according to one embodiment.

FIG. 5 illustrates the transmission of data, audio or video frames during a one-stage TXOP according to one embodiment. When there is no overlapping basic service set present or when there is only one short frame in the queue for transmission, a TXOP is a single-stage TXOP. In one embodiment, after detecting the transmission medium has been idle for a period of time equal to the PCF inter-frame space (PIFS), an access point uses the AC_VO access category of the EDCA protocol, which has the highest priority among the access categories defined in the EDCA protocol, to contend for medium access right before transmitting video frames by broadcast or multicast. After the PIFS, the access point applies a random back-off delay D1 and, if the medium is still idle, waits for a period of time equal to the short inter-frame space (SIFS) before beginning the broadcast or multicast transmission. The delay between the transmissions of the frames during a reserved TXOP time interval may be equal to or greater than the SIFS.

As shown in FIG. 5, the basic service set BSS1 according to an embodiment includes the access point AP1 and stations STA1, STA2 and STA3. The TXOP is a one-stage TXOP as there is no overlapping basic service set. The reserved TXOP time interval consists of the transmission stage during which data, audio or video frames are transmitted. The access point AP1 broadcasts the TXOP information element to all stations in the basic service set BSS1 to reserve the TXOP time interval. The stations STA1, STA2 and STA3 can transmit frames up to the point when the reserved TXOP time interval begins. After detecting the transmission medium has been idle for a period of time equal to the PIFS, the access point AP1 contends for medium access right using the AC_VO access category of the EDCA protocol by delaying for a random back-off D1 plus a SIFS, as previously described, before transmitting the broadcast or multicast video frames during the transmission stage.

Figure 6:
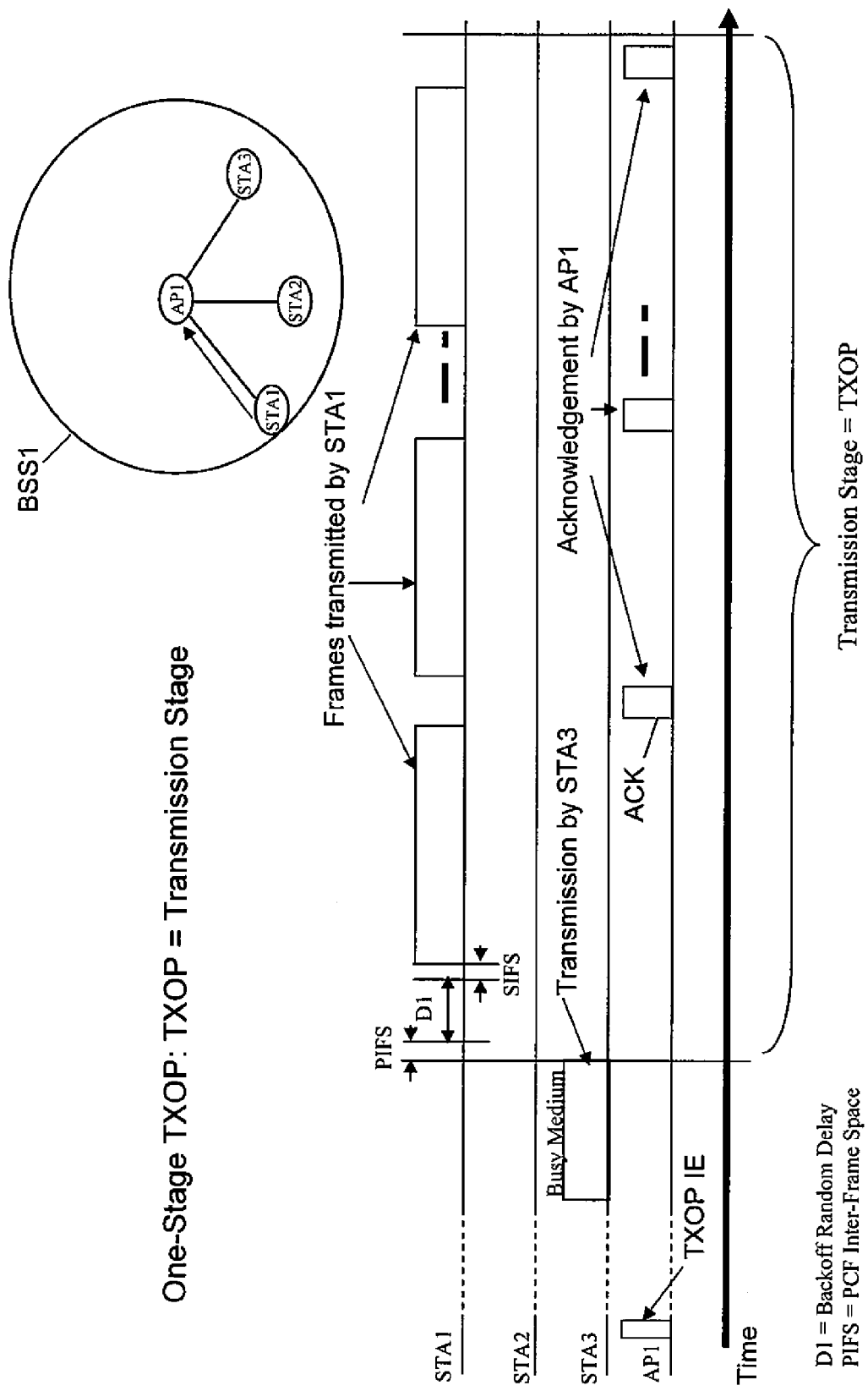
FIG. 6 is a timing diagram illustrating unicast transmission of data, audio or video frames during a one-stage TXOP with acknowledgement according to one embodiment.

FIG. 6 illustrates the unicast transmission of data, audio or video frames during a one-stage TXOP with acknowledgement according to one embodiment. When there is no overlapping basic service set, the TXOP is a one-stage TXOP and consists of a transmission stage for unicast transmission. As unicast is transmission from the access point to a station or from a station to the access point, the access point and/or the stations in the basic service set that are not the TXOP owner should defer initiating transmissions during the reserved TXOP time interval. This will ensure there is no collision during the reserved video TXOP, thus achieving reliable transmission and deterministic delay.

As shown in FIG. 6, the basic service set BSS1 according to an embodiment includes the access point AP1 and stations STA1, STA2 and STA3. The access point AP1 broadcasts the TXOP information element to all stations in the basic service set BSS1 to reserve the TXOP time interval for unicast transmission from the station ST1 to the access point AP1. The stations STA1, STA2 and STA3 can transmit frames up to the point when the reserved TXOP time interval begins. After detecting the transmission medium has been idle for a PIFS, the station STA1 contends for medium access right using the AC_VO access category of the EDCA protocol by delaying for a random back-off D1 plus a SIFS, as previously described, before transmitting the unicast video frames during the transmission stage. Upon receiving each unicast frame from station STA1, the access point AP1 transmits an acknowledgement (ACK) frame to station STA1 as a feedback to confirm the receipt of the frame just transmitted by station STA1. Alternatively, acknowledgement may not be required and the station STA1 will consecutively transmit the frames during the reserved TXOP time interval without the access point AP1 transmitting a respective ACK frame for each received frame.

Figure 7A:
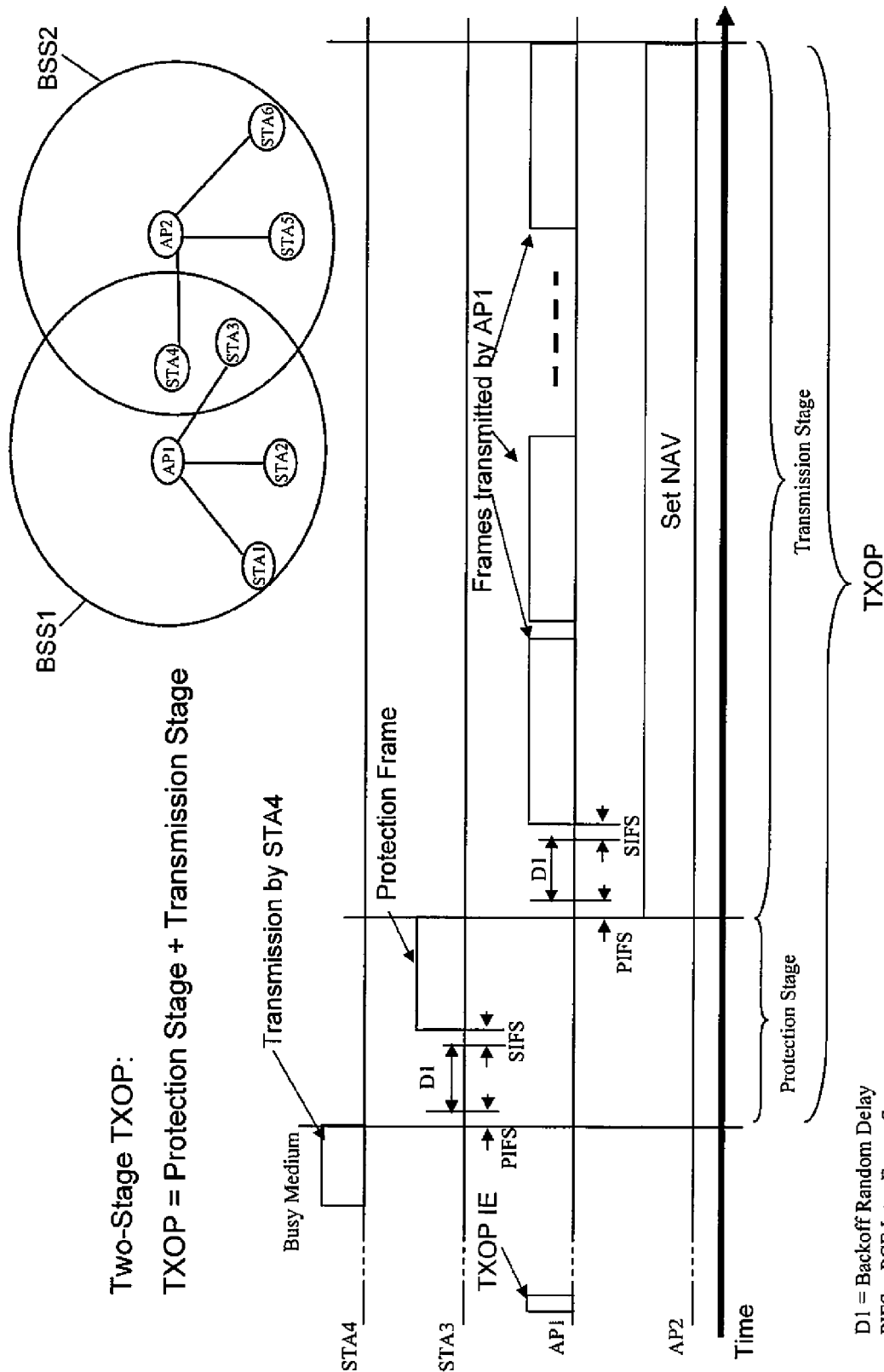
FIG. 7A is a timing diagram illustrating transmission of data, audio or video frames during a two-stage TXOP according to one embodiment.

FIG. 7A illustrates the transmission of data, audio or video frames during a two-stage TXOP according to one embodiment. When there is an overlapping basic service set, there are two stages in each reserved TXOP, namely a protection stage and a transmission stage. The protection stage should be long enough to cover a waiting period plus the duration for transmission of a protection frame. The waiting period may be determined based on the AC_VO access category of the EDCA protocol. For example, it may include a PIFS, a SIFS, and a random back-off delay D1 that may be equal to a default value for a contention window (CW), e.g., the $CW_{min}$ defined in the EDCA protocol. In one embodiment, the access point selects one or more stations in the basic service set to broadcast a protection frame in the protection stage to an overlapping basic service set.

In one embodiment, an IEEE 802.11k neighbor report or other suitable method, including using beacons or action frames to indicate the selection, is utilized to select stations to transmit protection frames. Stations are selected to transmit the protection frame on the basis that they are capable of transmitting the protection frame to the access points of all overlapping basic service sets in the neighborhood to minimize chances of collisions. In one embodiment, each selected station transmits the protection frame in compliance with the EDCA protocol. If a station selected to transmit the protection frame cannot start the transmission during the protection stage, it should not transmit the protection frame. The other stations in the basic service set that are not selected to transmit the protection frame should not transmit any frame during the protection stage in order to avoid collisions.

After detecting the transmission medium has been idle for a period of time equal to the PIFS, a station selected to broadcast the protection frame may delay for a random back-off plus a period of time equal to the SIFS before transmitting the protection frame. After the transmission of the protection frame, the access point waits for a period of time equal to the PIFS before beginning transmission of the video frames. Alternatively, the access point may wait longer than a period of time equal to the PIFS, such as a period of time equal to the PIFS plus the random back-off delay D1 and the SIFS, as previously described, before beginning transmission of the video frames, as shown in FIG. 7A.

In one embodiment, the protection frame is a control frame, e.g., a null frame or CTS2Self frame, and has a duration field in the MAC header. The duration value set in the duration field of a protection frame indicates the protection duration, which should be long enough to cover the entire reserved TXOP time interval. An overlapping basic service set, such as a legacy basic service set, will be prohibited from transmitting during the protection duration to avoid collisions upon receiving the protection frame. Upon receiving the protection frame, stations and the access point of the overlapping basic service set will set NAV according to the IEEE 802.11 standards to defer transmission until after the protection duration.

In one embodiment, if a station always detects collided frames transmitted from its associated access point during a reserved TXOP time interval, the station notifies the access point using an action frame. Accordingly, the access point reserves a new TXOP time interval to avoid transmission collisions. This should solve the problem in a situation where two overlapping basic service sets reserve overlapping TXOP time intervals.

As shown in FIG. 7A, the basic service set BSS1 according to an embodiment includes the access point AP1 and stations STA1, STA2 and STA3. The basic service set BSS2 includes the access point AP2 and stations STA4, STA5 and STA6. The basic service set BSS1 and the basic service set BSS2 overlap each other. Because station STA3 of the basic service set BSS1 is within the transmission range of the basic service set BSS2, station STA3 is selected by access point AP1 of the basic service set BSS1 to broadcast the protection frame. The access point AP1 broadcasts the TXOP information element to all stations in the basic service set BSS1 to reserve the TXOP time interval for broadcast or multicast transmission of data, audio or video frames. The stations STA1, STA2 and STA3 can transmit frames up to the point when the reserved TXOP time interval begins. After detecting the transmission medium has been idle for a period of time equal to the PIFS, station STA3 contends for medium access right according to the EDCA protocol and broadcasts the protection frame. After station STA3 broadcasts the protection frame, which includes a duration field to indicate the protection duration, the access point AP1 transmits the broadcast or multicast video frames after at least a period of time equal to the PIFS. Alternatively, the access point AP1 may begin to transmit the data, audio or video frames after a period of time equal to the PIFS plus the random back-off delay D1 and the SIFS, as previously described. Upon receiving the protection frame, the access point AP2 of the basic service set BSS2 sets the NAV for the basic service set BSS2 so that there is no transmission by the access point AP2 and stations of the basic service set BSS2 during the protection duration. Thus, inter-BSS as well as intra-BSS collisions can be avoided.

Figure 7B:
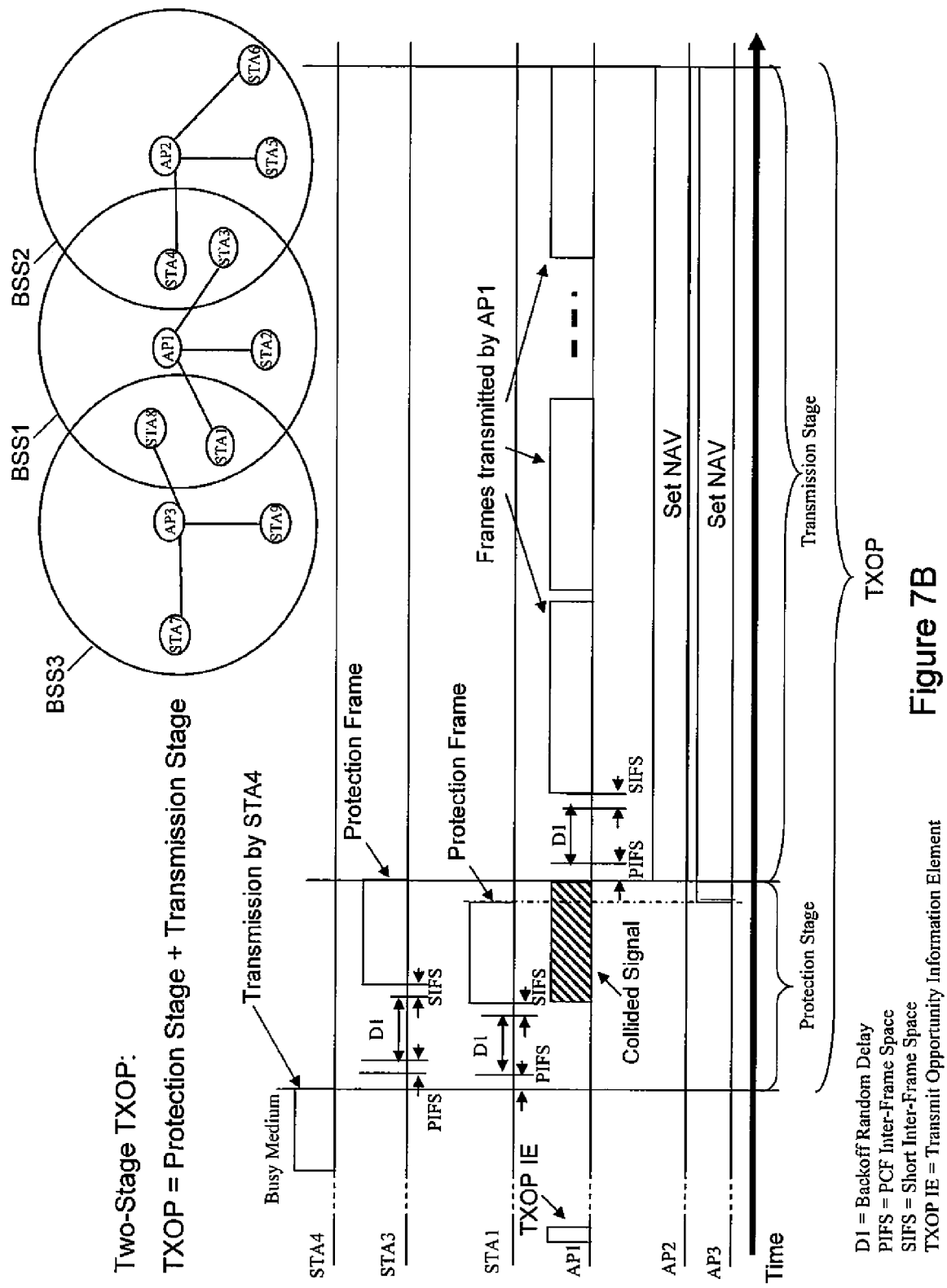
FIG. 7B is a timing diagram illustrating transmission of data, audio or video frames during a two-stage TXOP according to another embodiment.

FIG. 7B illustrates the transmission of data, audio or video frames during a two-stage TXOP according to another embodiment. As shown in FIG. 7B, the basic service set BSS1 according to an embodiment includes the access point AP1 and stations STA1, STA2 and STA3. The basic service set BSS1 overlaps with the basic service set BSS2 and the basic service set BSS3. Because station STA3 of the basic service set BSS1 is within the transmission range of the basic service set BSS2, station STA3 is selected by the access point AP1 of the basic service set BSS1 to broadcast the protection frame. Likewise, because station STA1 of the basic service set BSS1 is within the transmission range of the basic service set BSS3, station STA1 is selected by the access point AP1 to broadcast the protection frame. As described previously, stations STA1 and STA3 may be selected based on an IEEE 802.11k neighbor report or other suitable method, including using beacons or action frames to indicate the selection.

As station STA1 is not within the transmission range of the basic service set BSS2, station STA1 may begin the protection stage before a transmission in the basic service set BSS2 ends. As shown in FIG. 7B, in one embodiment station STA1 begins the protection stage before transmission by station STA4 of the basic service set BSS2 ends. Because station STA3 is within the transmission range of the basic service set BSS2, transmission of the protection frame by station STA3 does not begin until some time after the beginning of transmission of the protection frame by station STA1. Upon receiving the protection frame, the access point AP2 of the basic service set BSS2 and the access point AP3 of the basic service set BSS3 set NAV to defer any transmission in the respective basic service set until after the protection duration ends. Thus, collisions with a legacy overlapping basic service set may be prevented.

Figure 7C:
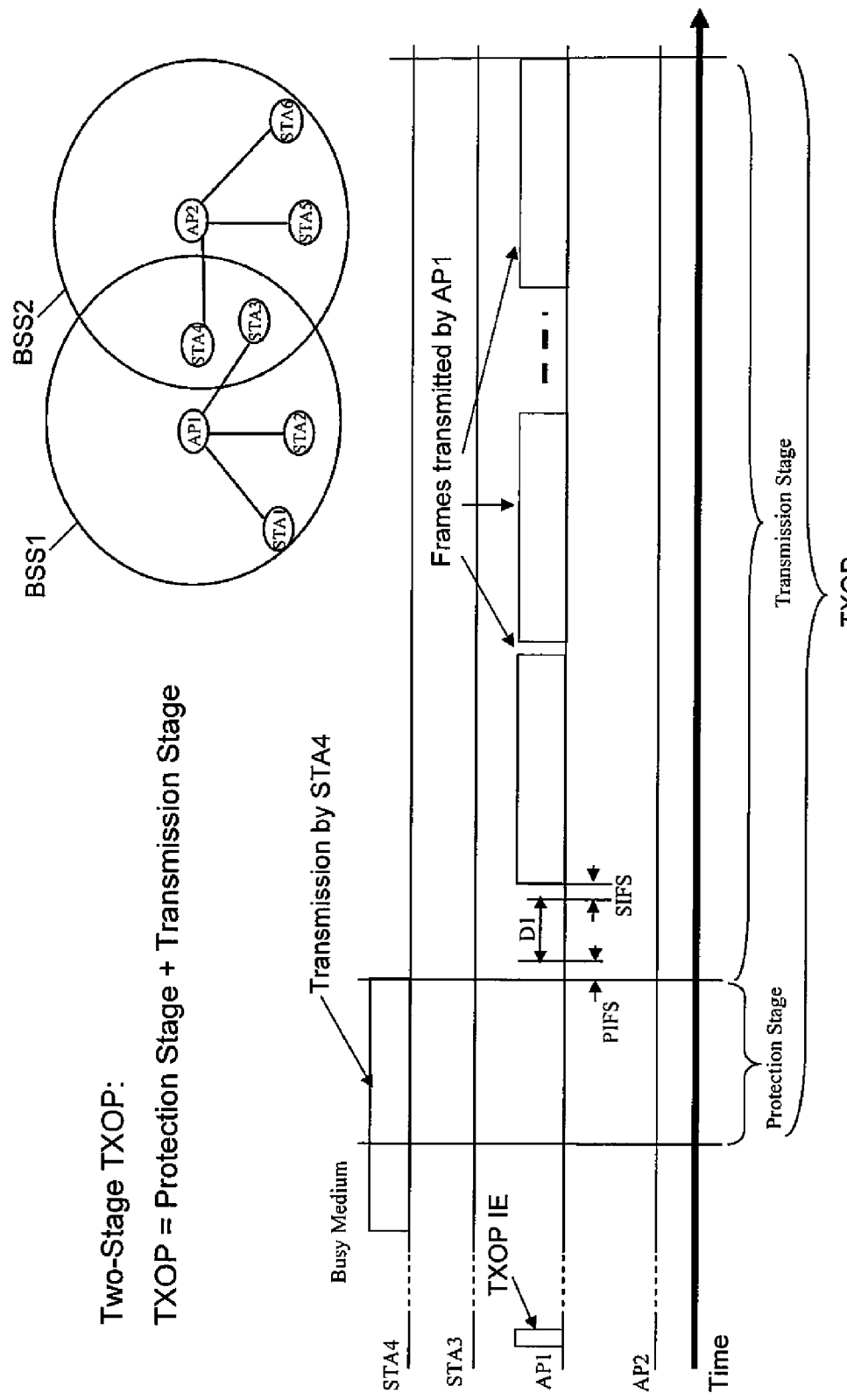
FIG. 7C is a timing diagram illustrating transmission of data, audio or video frames during a two-stage TXOP according to yet another embodiment.

FIG. 7C illustrates the transmission of data, audio or video frames during a two-stage TXOP according to yet another embodiment. In one embodiment, if a station selected to broadcast the protection frame is somehow not capable of transmitting the protection frame during the protection stage of the two-stage TXOP, the access point transmits the data, audio or video frames without a protection frame having been broadcasted first.

As shown in FIG. 7C, station STA3 of the basic service set BSS1 according to an embodiment is selected to broadcast the protection frame as station STA3 is within the transmission range of the basic service set BSS2. However, station STA3 is not able to broadcast the protection frame during the protection stage as, for example, station STA4 is still transmitting for some period of time after the reserved TXOP time interval has begun. In such case, the access point AP1 transmits the data, audio or video frames without protection. The access point AP1 contends for medium access right, after the transmission by station STA4, using the AC_VO access category of the EDCA protocol before transmitting the data, audio or video frames. As soon as station STA4 finishes transmission, the access point AP1 begins to transmit the data, audio or video frames after a period of time equal to the PIFS plus the random back-off delay D1 and the SIFS, as shown in FIG. 7C.

Figure 8A:
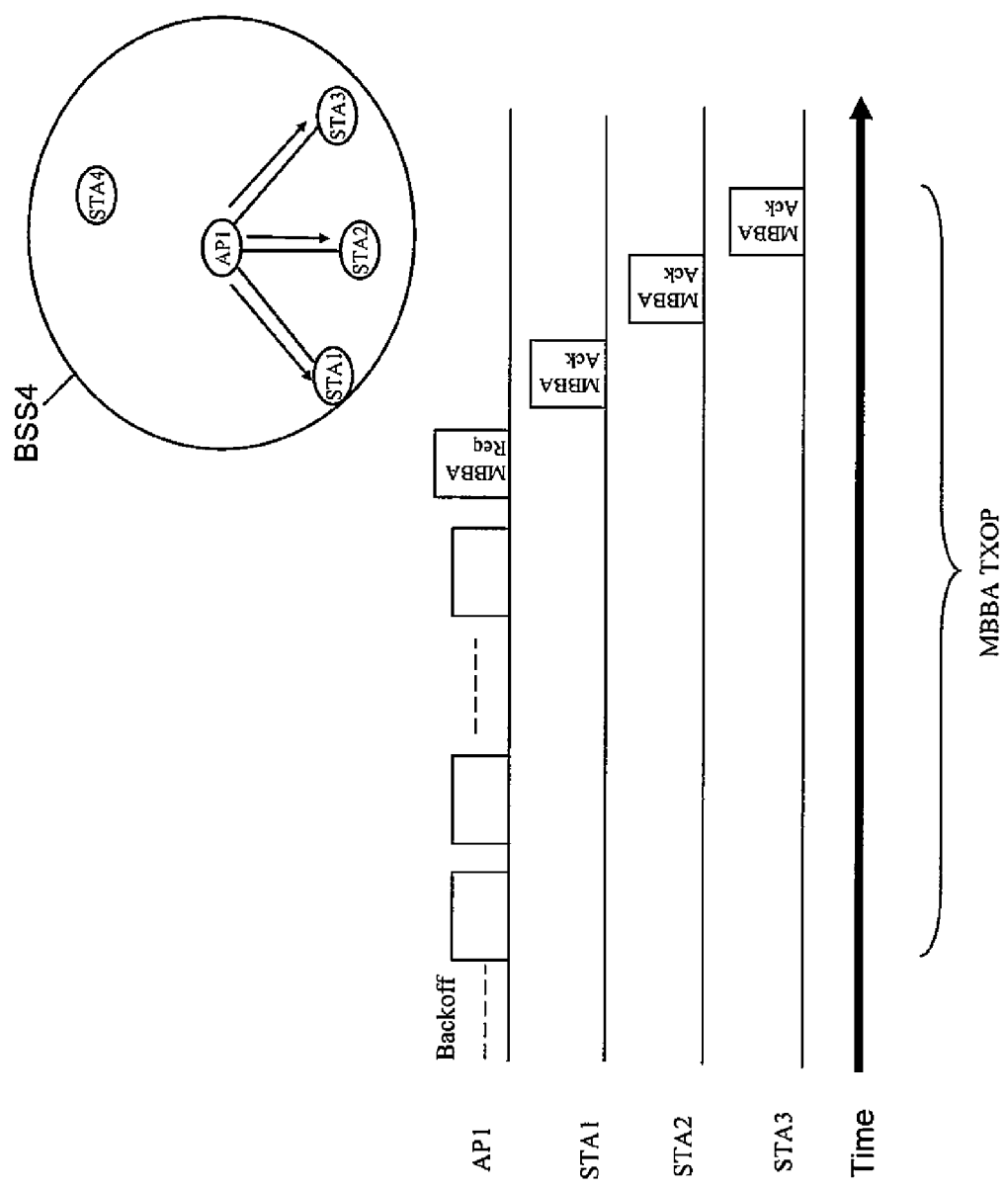
FIG. 8A is a timing diagram illustrating transmission of data, audio or video frames with block acknowledgement in a reserved TXOP or non-reserved TXOP according to one embodiment.

FIG. 8A illustrates the transmission of data, audio or video frames with block acknowledgement in a reserved TXOP or non-reserved TXOP according to one embodiment. In an inventive feedback scheme, feedback is provided by one or more destinations to the source of data, audio or video frames transmitted by broadcast or multicast. It is believed the feedback mechanism improves the reliability of broadcast and multicast transmission in the reserved TXOP or non-reserved TXOP. In one embodiment, an access point selects a single station to provide the feedback such as transmitting an acknowledgement frame to acknowledge the receipt of a number, or a block, of data, audio or video frames. In another embodiment, the access point selects multiple stations to provide the feedback by each transmitting a respective acknowledgement frame to acknowledge the receipt of a block of data, audio or video frames. The selected multiple stations may or may not be in the overlapping area. In such case, the access point may specify the sequence in which the selected multiple stations are to transmit the acknowledgement frames. For example, the access point may specify a start time, an offset to a start time, and duration for transmitting the acknowledgement frame for each of the selected stations.

In one embodiment, an access point maintains a multicast/broadcast block acknowledgement (MBBA) group, which includes the access point and one or more of the stations in the basic service set. The access point selects one, some, or all of the stations in the basic service set to reply with an MBBA acknowledgement (MBBA Ack) frame by transmitting an MBBA request (MBBA Req) frame to the selected station or stations. The MBBA Req frame specifies a start time, a respective offset to the start time for each of the selected stations, duration for transmitting the respective MBBA Ack frame, and a respective order for each selected station to transmit the respective MBBA Ack frame so that the MBBA Ack frames can be received sequentially. The access point transmits the MBBA Req frame following the broadcast or multicast of a block of data, audio or video frames. Alternatively, the access point may transmit the MBBA Req frame before the broadcast or multicast of the block of data, audio or video frames to protect the subsequent broadcast or multicast block transmission.

In one embodiment, a station in a basic service set where an MBBA group is maintained by the access point is allowed to join the MBBA group if the station is not already in the MBBA group. A station is also allowed to leave an MBBA group in some embodiments. Additionally, the access point can tear down an MBBA group. For example, to join the MBBA group, the station sends an add multicast/broadcast block acknowledgement (ADDMBBA) request frame to the access point. After receiving the ADDMBBA request frame, the access point replies with an ADDMBBA response frame to the station to complete the joining process. To leave the MBBA group, a station sends a leave multicast/broadcast block acknowledgement (LVMBBA) frame to the access point to inform the access point of the station's departure from the MBBA group. To tear down the MBBA group, the access point transmits an LVMBBA frame to each station in the MBBA group via unicast, multicast, or broadcast transmission. If all stations in the MBBA group have left the MBBA group, the access point also tears down the MBBA group by transmitting an LVMBBA frame to each station in the MBBA group via unicast, multicast, or broadcast transmission.

In one embodiment, the MBBA frame transmitted by each station in the MBBA group corresponds to only the immediate preceding MBBA Req frame from the access point. The access point uses the MBBA Req frame to request some or all of the destination stations to provide feedback by responding with an MBBA Ack frame. In one embodiment, an MBBA Req frame is defined by providing the multicast or broadcast destination addresses in a normal block acknowledgement request frame, such as a unicast BlockAck Req frame which is used in unicast transmissions. In another embodiment, an MBBA Req frame is defined by using bit 11 in the control field of a normal request frame to indicate such request frame is an MBBA Req frame. In yet another embodiment, an MBBA Req frame may be defined by allocating a new control frame as the MBBA Req frame. The use of normal request frame to define an MBBA Req frame allows the proposed feedback scheme to be implemented in legacy basic service sets.

Relative to a normal request frame, an MBBA Req frame has additional fields. In one embodiment, an MBBA Req frame includes at least a station identifier for each station in the MBBA group, an MBBA acknowledgement start offset indicating the offset relative to the start of the MBBA Req frame, and an MBBA duration indicating the duration for the transmission of the MBBA frame. In other embodiments the MBBA Req frame may have additional fields defining other aspects of the MBBA frame.

As shown in FIG. 8A, the basic service set BSS4 according to an embodiment includes the access point AP1 and stations STA1, STA2, STA3 and STA4. In the example shown, only the stations STA1, STA2 and STA3 among the stations in the basic service set BSS4 are in the MBBA group. After sufficient backoff delay, the access point AP1 transmits a number of data, audio or video frames to stations STA1, STA2 and STA3, but not to STA4. After transmission of the data, audio or video frames, the access point AP1 transmits an MBBA Req frame to the stations STA1, STA2 and STA3. In response, each of the stations STA1, STA2 and STA3 transmits a respective MBBA Ack frame according to the respective defined parameters, such as the respective start time. This allows the access point AP1 to sequentially receive the MBBA Ack frames.

Figure 8B:
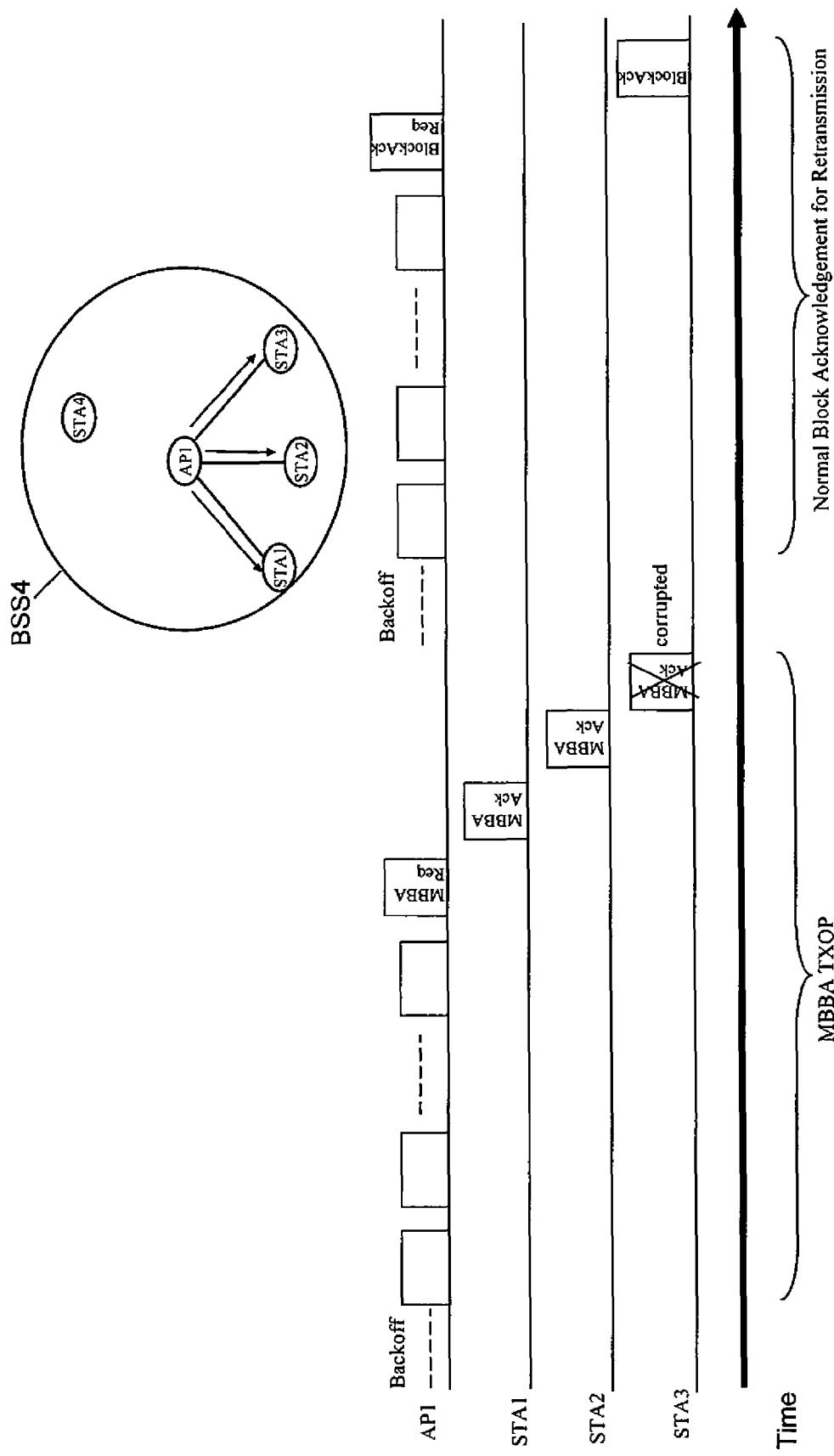
FIG. 8B is a timing diagram illustrating transmission of data, audio or video frames with block acknowledgement in a reserved TXOP or non-reserved TXOP according to another embodiment.

FIG. 8B illustrates the transmission of data, audio or video frames with block acknowledgement in a reserved TXOP or non-reserved TXOP according to another embodiment. In an inventive retransmission scheme, an access point uses the MBBA mechanism to retransmit the frames when the frames are not received correctly, such as being corrupted when received, by one or more of the destination stations in the basic service set. In one embedment, a station in the basic service set where the access point retransmits frames may discard the repeated frames, i.e., the same frames received by the station from the access point due to the retransmission. In one embodiment, a station must reply with an MBBA Ack frame if requested by the access point, even if the station discards the repeated frames. In one embodiment, the access point may use the normal block acknowledgement procedure as known in the art to retransmit the frames to the stations that did not receive the frames correctly. In another embodiment, when only a portion of the transmitted frames needs to be retransmitted, the access point may retransmit those frames with normal acknowledgement procedure as known in the art.

As shown in FIG. 8B, the basic service set BSS4 according to an embodiment includes the access point AP1 and stations STA1, STA2, STA3 and STA4. In the example shown, only the stations STA1, STA2 and STA3 among the stations in the basic service set BSS4 are in the MBBA group. After sufficient backoff delay, the access point AP1 transmits a number of data, audio or video frames to stations STA1, STA2 and STA3, but not to STA4. After transmission of the data, audio or video frames, the access point AP1 transmits an MBBA Req frame to the stations STA1, STA2 and STA3. In response, stations STA1 and STA2 each transmits a respective MBBA Ack frame. The station STA3 does not transmit a respective MBBA Ack frame as requested in the MBBA Req frame because the station STA3 did not receive the data, audio or video frames. In the example shown, the access point AP1 retransmits the data, audio or video frames, followed by a BlockAck Req frame. If the data, audio or video frames are received correctly by the station STA3, the station STA3 transmits a block acknowledgement (Block Ack) frame to acknowledge the receipt of the retransmitted frames.

Figure 9A:
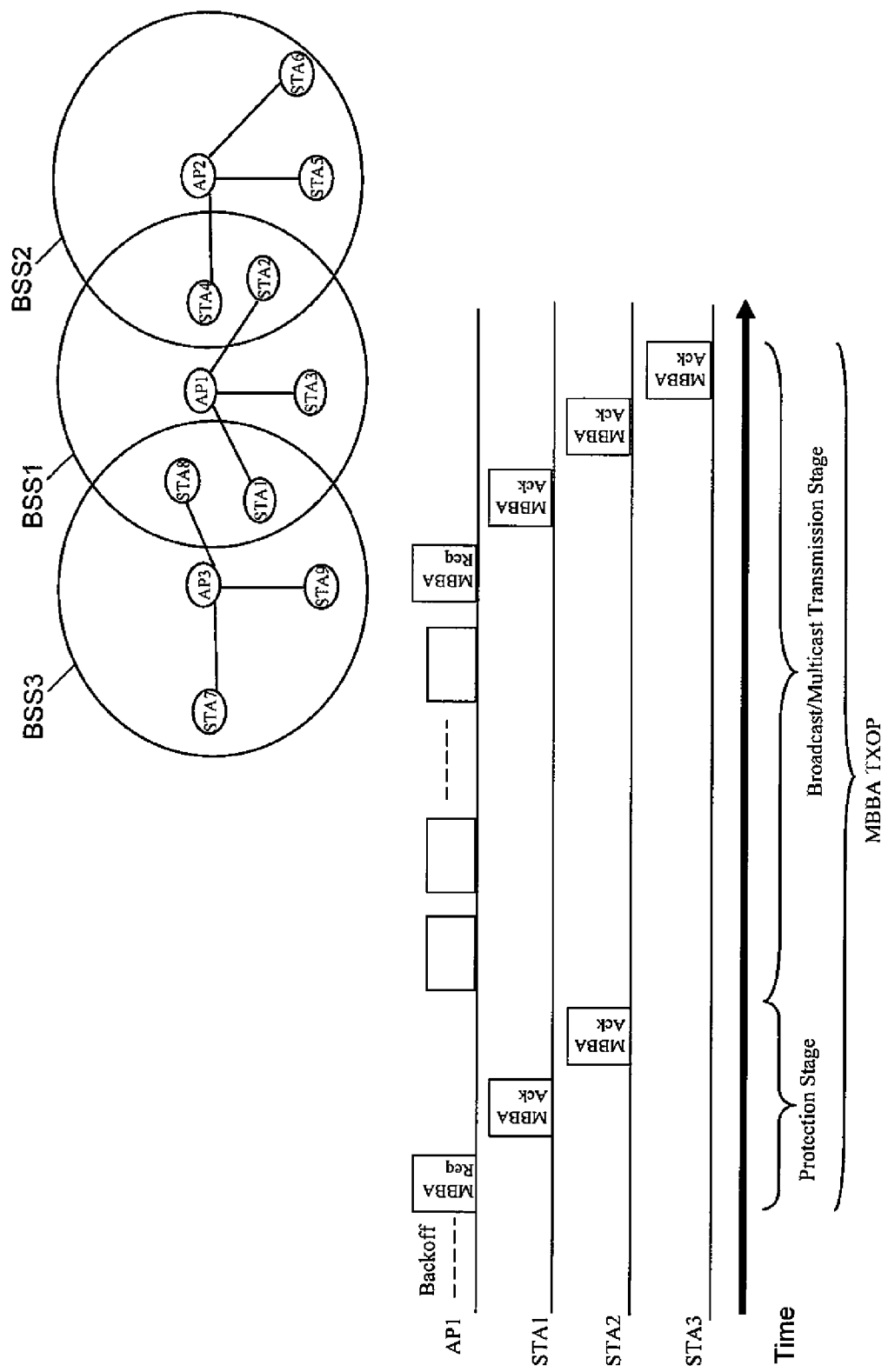
FIG. 9A is a timing diagram illustrating protected transmission of data, audio or video frames with block acknowledgement in a reserved TXOP or non-reserved TXOP according to one embodiment.

FIG. 9A illustrates the protected transmission of data, audio or video frames with block acknowledgement in a reserved TXOP or non-reserved TXOP according to one embodiment. In an inventive two-stage transmission scheme, an MBBA TXOP includes two stages: a protection stage and a transmission stage for multicast or broadcast. During the protection stage, the access point transmits an MBBA Req frame and selected one or ones of the stations in the basic service set respond with an MBBA Ack frame. An access point of an overlapping basic service set refrains from transmission during the remainder of the MBBA TXOP upon receiving the MBBA Ack frame. During the transmission stage, the frames are transmitted under the MBBA request and acknowledgement scheme described above. In one embodiment, stations are selected to transmit the MBBA Ack frame on the basis that they are capable of transmitting the MBBA Ack frame to the access points of all overlapping basic service sets in the neighborhood to minimize chances of collisions. The other stations in the basic service set that are not selected to transmit the MBBA Ack frame should not transmit any frame during the protection stage in order to avoid collisions. In one embodiment, an IEEE 802.11k neighbor report or other suitable method, including using beacons or action frames to indicate the selection, is utilized to select stations to transmit protection frames.

As shown in FIG. 9A, the basic service set BSS1 overlaps with the basic service sets BSS2 and BSS3. Station STA1 of the basic service set BSS1 is within transmission range of the access point AP3 or one or more of the stations of the basic service set BSS3. Station STA2 of the basic service set BSS1 is within transmission range of the access point AP2 or one or more of the stations of the basic service set BSS2. After sufficient backoff delay, the access point AP1 transmits an MBBA Req frame. In response, stations STA1 and STA2 each transmits a respective MBBA Ack frame. The access point AP1 then transmits data, audio or video frames via multicast or broadcast and an MBBA Req frame to stations STA1, STA2 and STA3. Each of the stations STA1, STA2 and STA3 responds by transmitting a respective MBBA Ack frame.

Figure 9B:
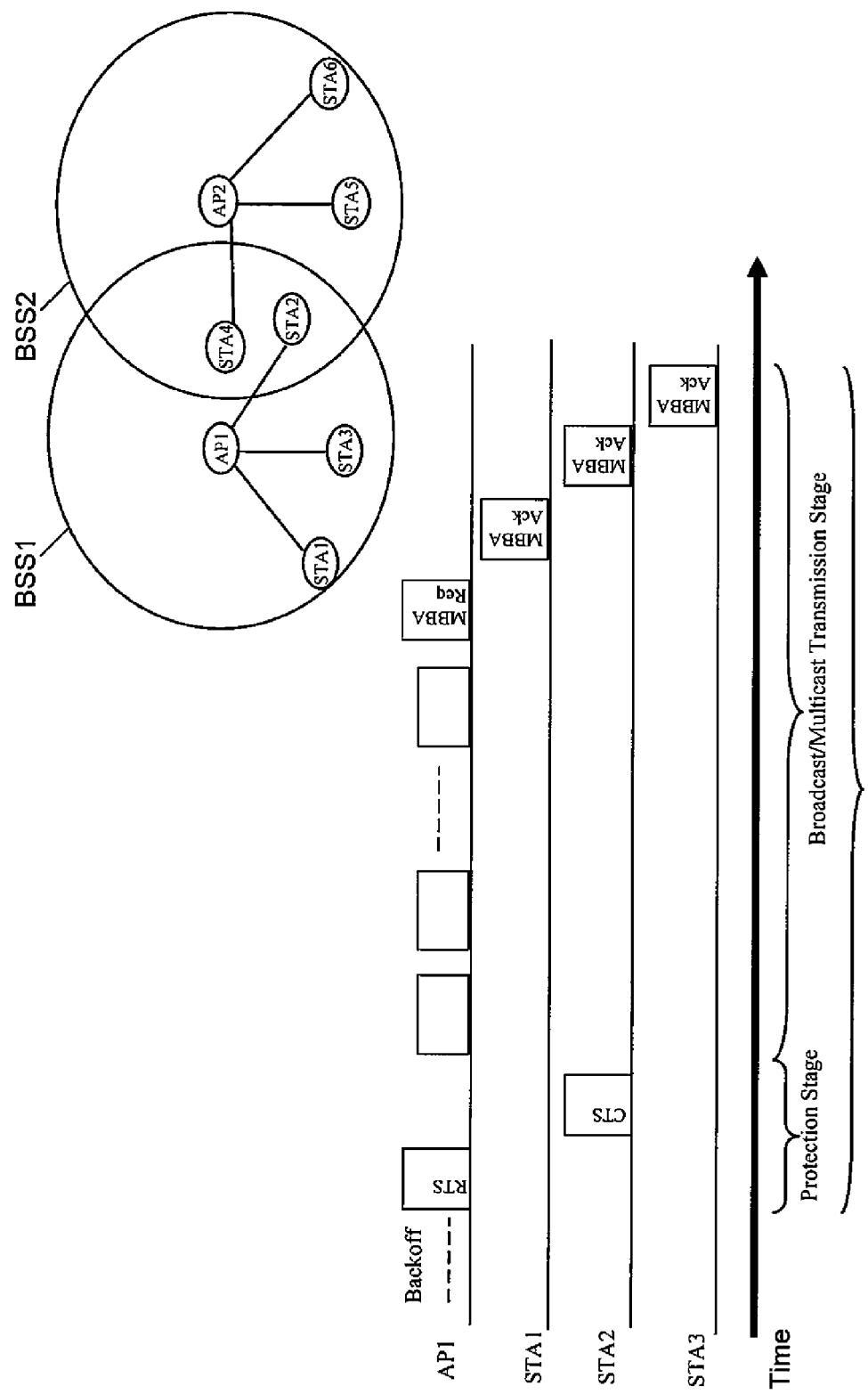
FIG. 9B is a timing diagram illustrating protected transmission of data, audio or video frames with block acknowledgement in a reserved TXOP or non-reserved TXOP according to another embodiment.

FIG. 9B illustrates the protected transmission of data, audio or video frames with block acknowledgement in a reserved TXOP or non-reserved TXOP according to another embodiment. In an alternative embodiment, an access point transmits an RTS frame and a station transmits a CTS frame in response during the protection stage of a two-stage MBBA TXOP. An access point of an overlapping basic service set refrains from transmission during the remainder of the MBBA TXOP upon receiving the CTS frame. During the transmission stage, the frames are transmitted under the MBBA request and acknowledgement scheme described above.

As shown in FIG. 9B, the basic service set BSS1 overlaps with the basic service set BSS2. Station STA2 of the basic service set BSS1 is within transmission range of the access point AP2 or one or more of the stations of the basic service set BSS2. After sufficient backoff delay, the access point AP1 transmits an RTS frame to station STA2. In response, station STA2 transmits a CTS frame. The access point AP1 then transmits data, audio or video frames via multicast or broadcast and an MBBA Req frame to stations STA1, STA2 and STA3. Each of the stations STA1, STA2 and STA3 responds by transmitting a respective MBBA Ack frame.

Figure 10A:
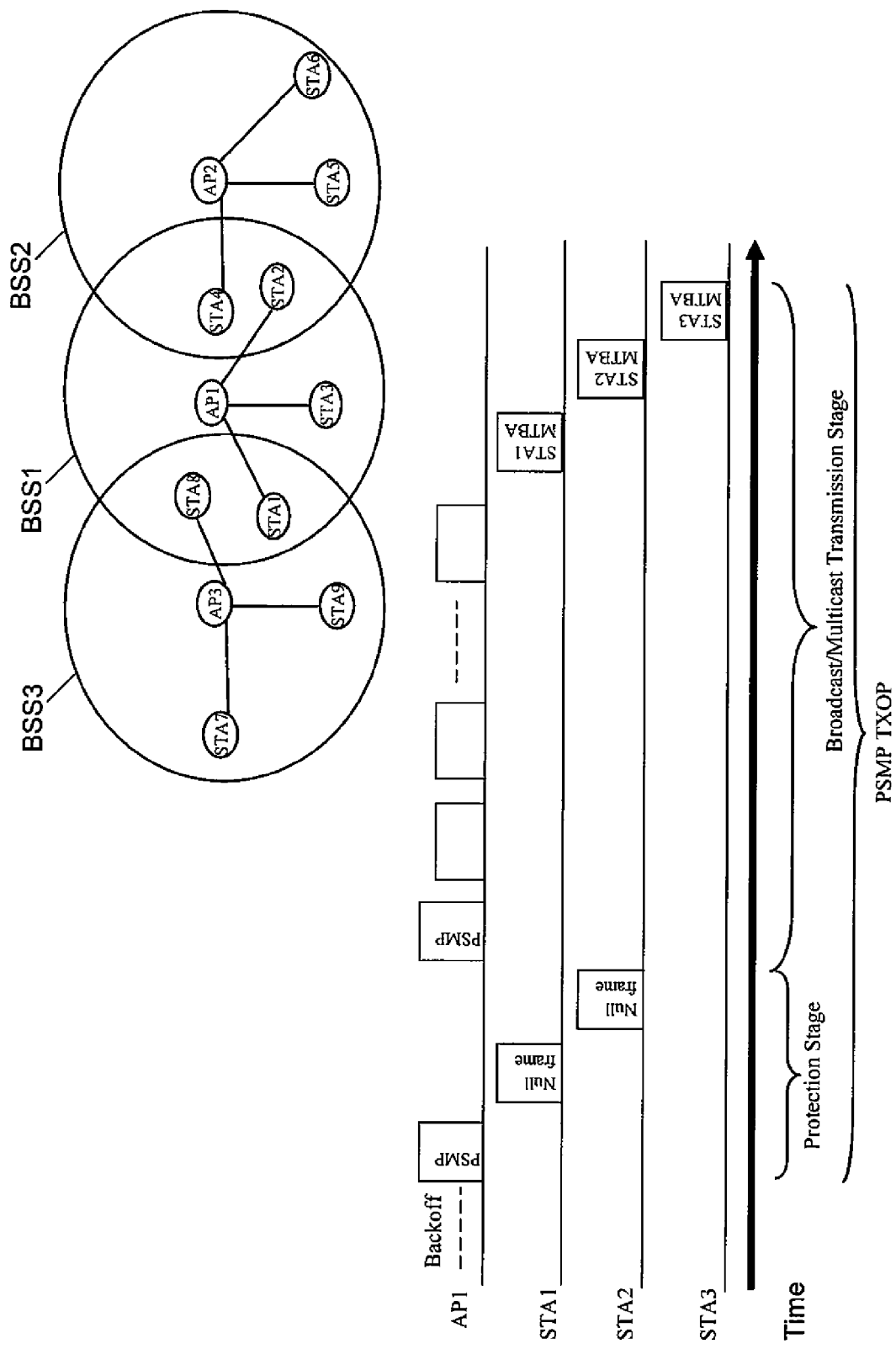
FIG. 10A is a timing diagram illustrating protected transmission of data, audio or video frames with block acknowledgement and power save multi-poll in a reserved TXOP or non-reserved TXOP according to one embodiment.

FIG. 10A illustrates the protected transmission of data, audio or video frames with block acknowledgement and power save multi-poll in a reserved TXOP or non-reserved TXOP according to one embodiment. In an inventive two-stage transmission scheme, power save multi-poll (PSMP) communication is used to provide a PSMP TXOP that includes a protection stage and a transmission stage for reliable multicast or broadcast communication. As the PSMP TXOP needs protection to avoid OBSS collision, there are two proposed approaches to provide protection as shown in FIG. 10A and FIG. 10B, respectively. In one approach, before the PSMP TXOP, an access point selects more than one station in a group of stations that receive multicast transmission from the access point and establishes a PSMP communication with the selected stations to protect the PSMP TXOP. In the protection stage, the access point transmits a PSMP frame and, in response, each selected station transmits a null frame. Alternatively, other protection frames may be used instead. No downlink data frames are transmitted from the access point to the stations during the protection stage. The uplink duration is only long enough to allow a null frame to be transmitted from a station to the access point. If there are buffered frames to be transmitted to the access point, the station will respond with a null frame to request more uplink transmit opportunity. If there is no buffered frame, the station will respond with a null frame to indicate no buffered frames. In the transmission stage, the access point first transmits a PSMP frame then transmits a number of data, audio or video frames.

In one embodiment, stations are selected to transmit the null frame on the basis that they are capable of transmitting the null frame to the access points of all overlapping basic service sets in the neighborhood to minimize chances of collisions. The other stations in the basic service set that are not selected to transmit the null frame should not transmit any frame during the protection stage in order to avoid collisions. In one embodiment, an IEEE 802.11k neighbor report or other suitable method, including using beacons or action frames to indicate the selection, is utilized to select stations to transmit protection frames.

As shown in FIG. 10A, the basic service set BSS1 overlaps with the basic service sets BSS2 and BSS3. Stations STA1 of the basic service set BSS1 is within transmission range of the access point AP3 of the basic service set BSS3. Station STA2 of the basic service set BSS1 is within transmission range of the access point AP2 of the basic service set BSS2. After sufficient backoff delay, the access point AP1 transmits a PSMP frame. In response, the selected stations STA1 and STA2 each transmits a respective null frame. In the transmission stage, the access point AP1 first transmits a PSMP frame then transmits a number of data, audio or video frames via multicast or broadcast to stations STA1, STA2 and STA3. Each of the stations STA1, STA2 and STA3 responds by transmitting a respective multiple traffic block acknowledgement (MTBA) frame.

FIG. 10B illustrates the protected transmission of data, audio or video frames with block acknowledgement and power save multi-poll in a reserved TXOP or non-reserved TXOP according to another embodiment. In this approach, before the PSMPT TXOP, an access point selects one of the stations in a group of stations that receive multicast transmission from the access point and uses the RTS/CTS mechanism described above to protect the PSMP TXOP.

As shown in FIG. 10B, the basic service set BSS1 overlaps with the basic service set BSS2. Stations STA2 of the basic service set BSS1 is within transmission range of the access point AP2 of the basic service set BSS2. After sufficient backoff delay, the access point AP1 transmits an RTS frame to station STA2. In response, station STA2 transmits a CTS frame. In the transmission stage, the access point AP1 first transmits a PSMP frame then transmits a number of data, audio or video frames via multicast or broadcast to stations STA1, STA2 and STA3. Each of the stations STA1, STA2 and STA3 responds by transmitting a respective MTBA frame.

Figure 11A:
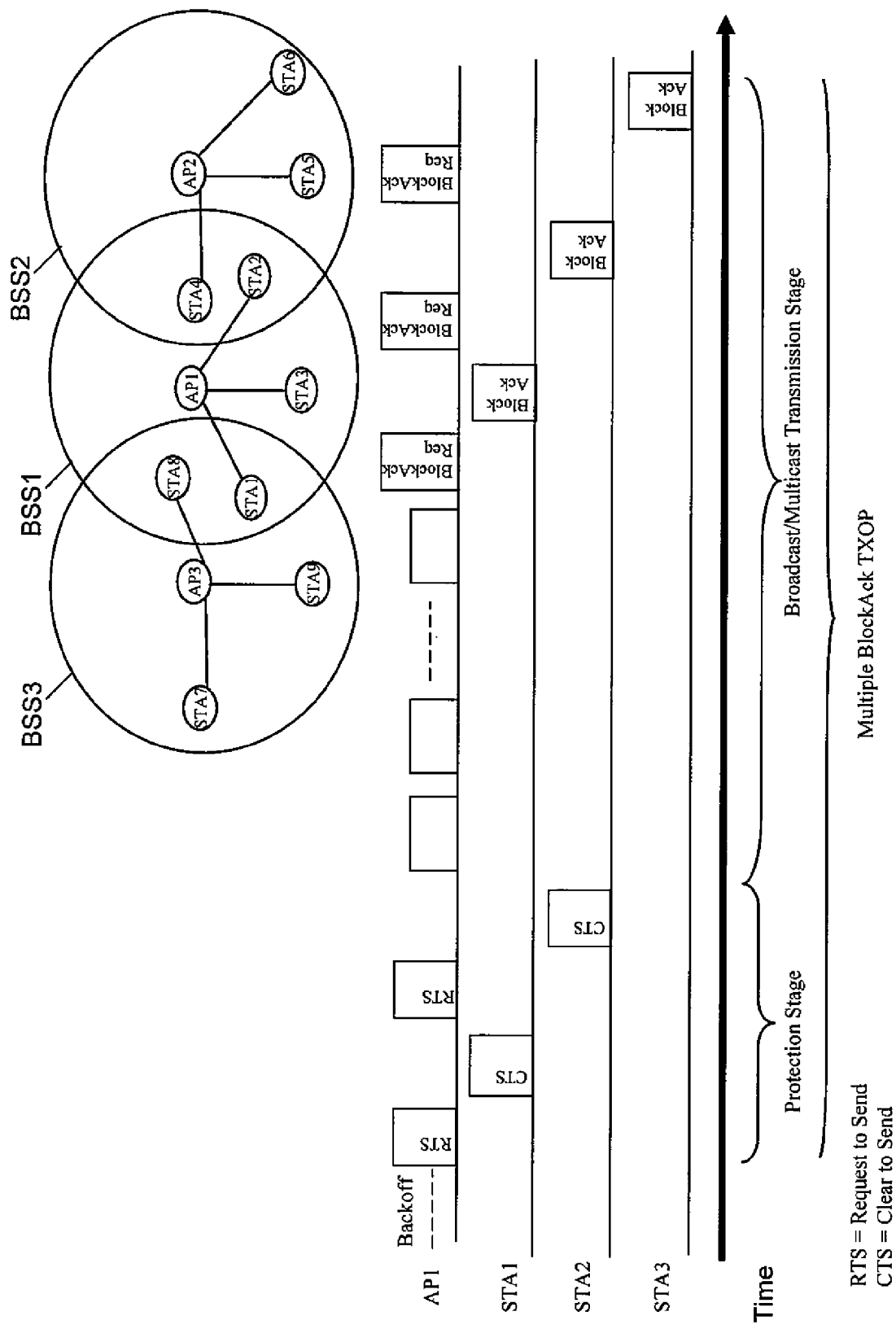
FIG. 11A is a timing diagram illustrating protected transmission of data, audio or video frames with multiple block acknowledgement requests in a reserved TXOP or non-reserved TXOP according to one embodiment.
Figure 11B:
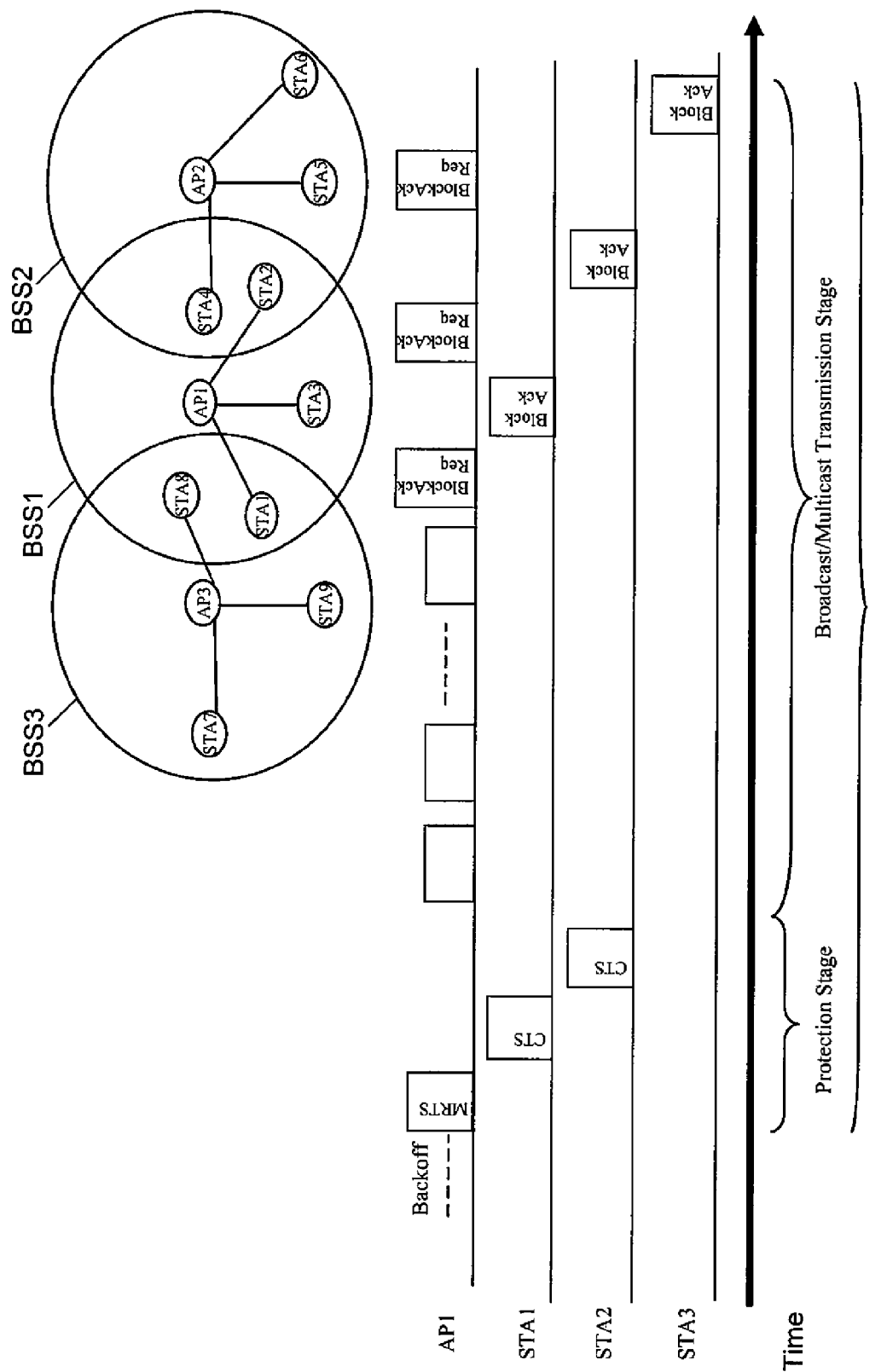
FIG. 11B is a timing diagram illustrating protected transmission of data, audio or video frames with multiple block acknowledgement requests in a reserved TXOP or non-reserved TXOP according to another embodiment.

FIG. 11A illustrates the protected transmission of data, audio or video frames with multiple block acknowledgement requests in a reserved TXOP or non-reserved TXOP according to one embodiment. In an inventive TXOP protection scheme, multiple block acknowledgement requests and block acknowledgements are used in a TXOP to provide reliable multicast or broadcast communication. As the BlockAck TXOP needs protection to avoid OBSS collision, there are two proposed approaches to provide protection as shown in FIG. 11A and FIG. 11B, respectively. In one approach, before the multiple BlockAck TXOP, an access point selects more than one station in a group of stations that receive multicast transmission from the access point and establishes multiple RTS/CTS communication with the selected stations to protect the TXOP. In one embodiment, in the protection stage, the access point transmits an RTS frame to a selected station and receives a CTS frame from the station, before transmitting another RTS to another selected station. In other embodiments, other protection frames may be used instead.

In one embodiment, stations are selected to transmit the CTS frame on the basis that they are capable of transmitting the CTS frame to the access points of all overlapping basic service sets in the neighborhood to minimize chances of collisions. The other stations in the basic service set that are not selected to transmit the CTS frame should not transmit any frame during the protection stage in order to avoid collisions. In one embodiment, an IEEE 802.11k neighbor report or other suitable method, including using beacons or action frames to indicate the selection, is utilized to select stations to transmit protection frames.

As shown in FIG. 11A, the basic service set BSS1 overlaps with the basic service sets BSS2 and BSS3. Stations STA1 of the basic service set BSS1 is within transmission range of the access point AP3 of the basic service set BSS3. Station STA2 of the basic service set BSS1 is within transmission range of the access point AP2 of the basic service set BSS2. After sufficient backoff delay, the access point AP1 transmits an RTS frame to the station STA1, which responds with a CTS frame. The access point AP1 then transmits an RTS frame to the station STA2, which responds with a CTS frame. In the transmission stage, the access point AP1 first transmits a number of data, audio or video frames via multicast or broadcast to stations STA1, STA2 and STA3. Afterwards, the access point AP1 transmits a separate BlockAck Req frame to each of the stations STA1, STA2 and STA3. In particular, a BlockAck Req frame for the station STA1 is first transmitted, then a BlockAck Req frame for the station STA2 is transmitted after the station STA1 responds with a BlockAck frame, and a BlockAck Req frame for the station STA3 is transmitted after the station STA2 responds with a BlockAck frame, followed by the station STA3 responding with a BlockAck frame.

FIG. 11B illustrates the protected transmission of data, audio or video frames with multiple block acknowledgement requests in a reserved TXOP or non-reserved TXOP according to another embodiment. In this approach, before the multiple BlockAck TXOP, an access point selects more than one station in a group of stations that receive multicast transmission from the access point and establishes multicast RTS/CTS communication with the selected stations to protect the TXOP. In one embodiment, in the protection stage, the access point transmits a multicast RTS frame to the selected multicast destination stations, and the multicast destination stations return CTS frames based on the sequence indicated by the access point.

As shown in FIG. 11B, the basic service set BSS1 overlaps with the basic service sets BSS2 and BSS3. Station STA1 of the basic service set BSS1 is within transmission range of the access point AP3 or one or more of the stations of the basic service set BSS3. Station STA2 of the basic service set BSS1 is within transmission range of the access point AP2 or one or more of the stations of the basic service set BSS2. After sufficient backoff delay, the access point AP1 transmits a multicast RTS frame to the stations STA1 and STA2, each of which responds with a respective CTS frame. In the transmission stage, the access point AP1 first transmits a number of data, audio or video frames via multicast or broadcast to stations STA1, STA2 and STA3. Afterwards, the access point AP1 transmits a separate BlockAck Req frame to each of the stations STA1, STA2 and STA3. In particular, a BlockAck Req frame for the station STA1 is first transmitted, then a BlockAck Req frame for the station STA2 is transmitted after the station STA1 responds with a BlockAck frame, and a BlockAck Req frame for the station STA3 is transmitted after the station STA2 responds with a BlockAck frame, followed by the station STA3 responding with a BlockAck frame.

Figure 12:
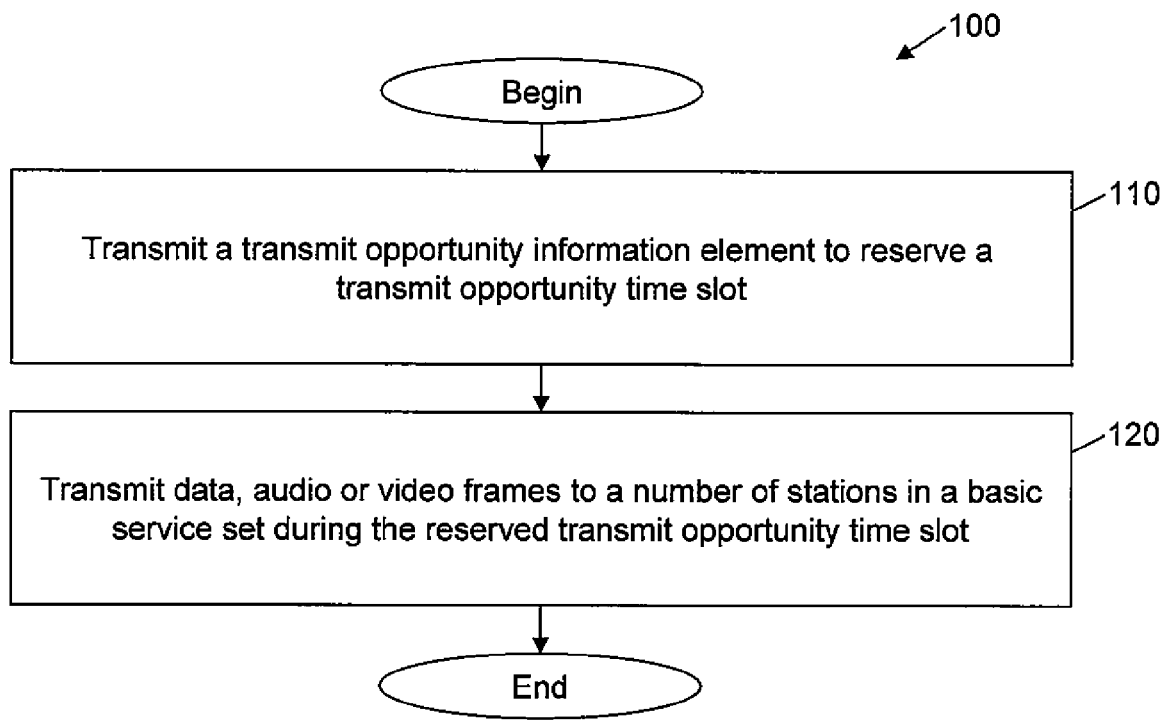
FIG. 12 is a flow chart illustrating a process of transmitting data, audio or video frames in a basic service set having a plurality of stations in a WLAN according to one embodiment.

FIG. 12 illustrates a process 100 of transmitting data, audio or video frames in a basic service set having a plurality of stations in a WLAN according to one embodiment. At 110, a TXOP information element is transmitted to reserve a TXOP time interval. At 120, the data, audio or video frames are transmitted to a number of the stations in the basic service set during the reserved TXOP time interval. In one embodiment, transmitting the TXOP information element may include transmitting at least one of an active indication to indicate whether or not the TXOP is currently enabled, an activation start time to indicate a time when the TXOP will be enabled if the TXOP is not currently enabled, a TXOP type, a source address, a destination address, a service interval, an offset to the service interval, and a duration of the TXOP. In an alternative embodiment, transmitting the TXOP information element may include broadcasting the TXOP information element using a DTIM beacon to the stations in the basic service set.

Figure 13A:
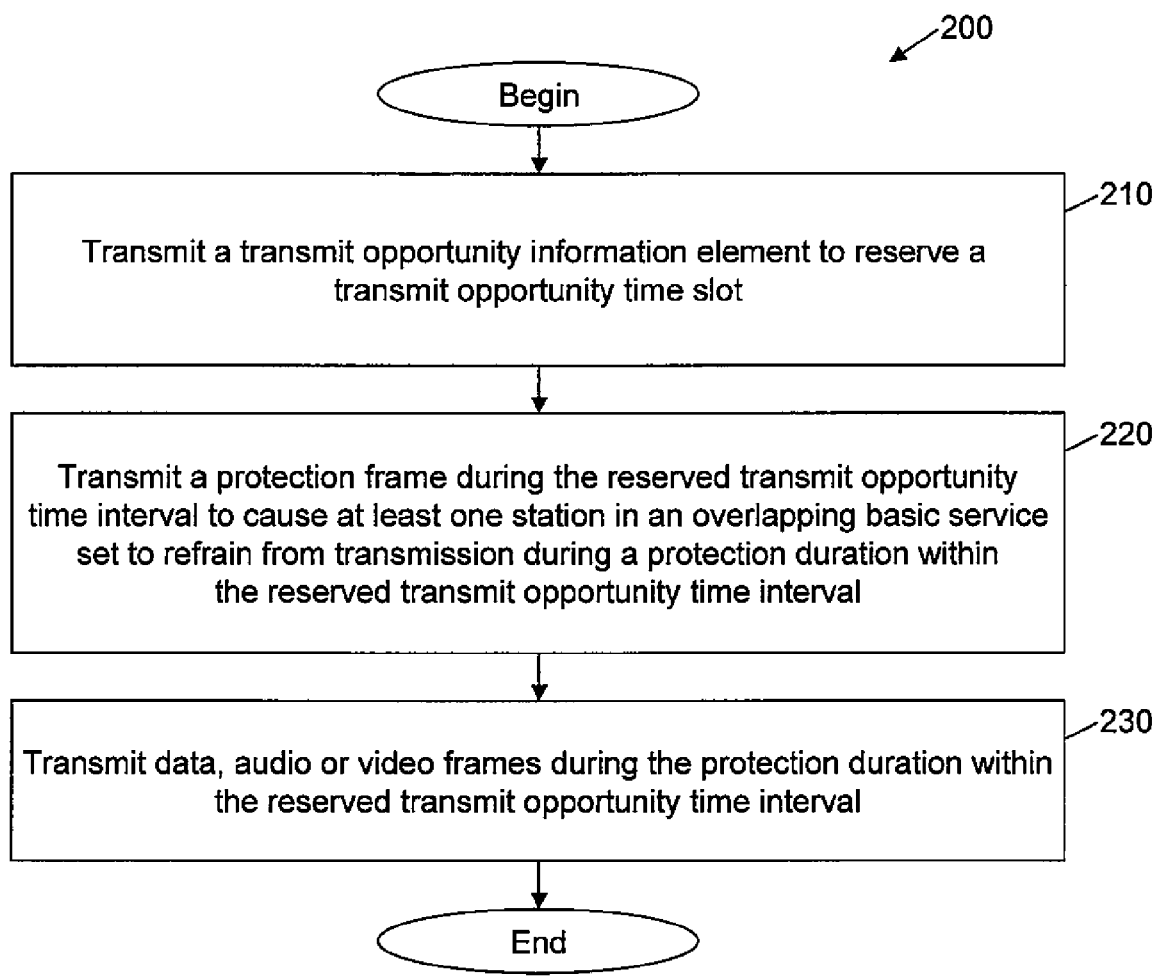
FIG. 13A is a flow chart illustrating a process of transmitting data, audio or video frames in a basic service set having a plurality of stations in the presence of an overlapping basic service set in a WLAN according to one embodiment.

FIG. 13A illustrates a process 200 of transmitting data, audio or video frames in a basic service set having a plurality of stations in the presence of an overlapping basic service set in a WLAN according to one embodiment. At 210, a TXOP information element is transmitted to reserve a TXOP time interval. At 220, a protection frame is transmitted during the reserved TXOP time interval to cause at least one station in the overlapping basic service set to refrain from transmission during a protection duration within the reserved TXOP time interval. At 230, the data, audio or video frames are transmitted during the protection duration within the reserved TXOP time interval. In one embodiment, transmitting the protection frame may include broadcasting a control frame that includes a duration field set to the protection duration. In one embodiment, transmitting the protection frame during the reserved TXOP time interval to cause at least one station in the overlapping basic service set to refrain from transmission during a protection duration within the reserved TXOP time interval may include assigning a first station in the basic service set to transmit the protection frame, the first station being within a transmission range of the overlapping basic service set; and broadcasting the protection frame that includes a protection duration from the first station to cause the at least one station in the overlapping basic service set to set a network allocation vector according to the IEEE 802.11 standards for the protection duration.

Figure 13B:
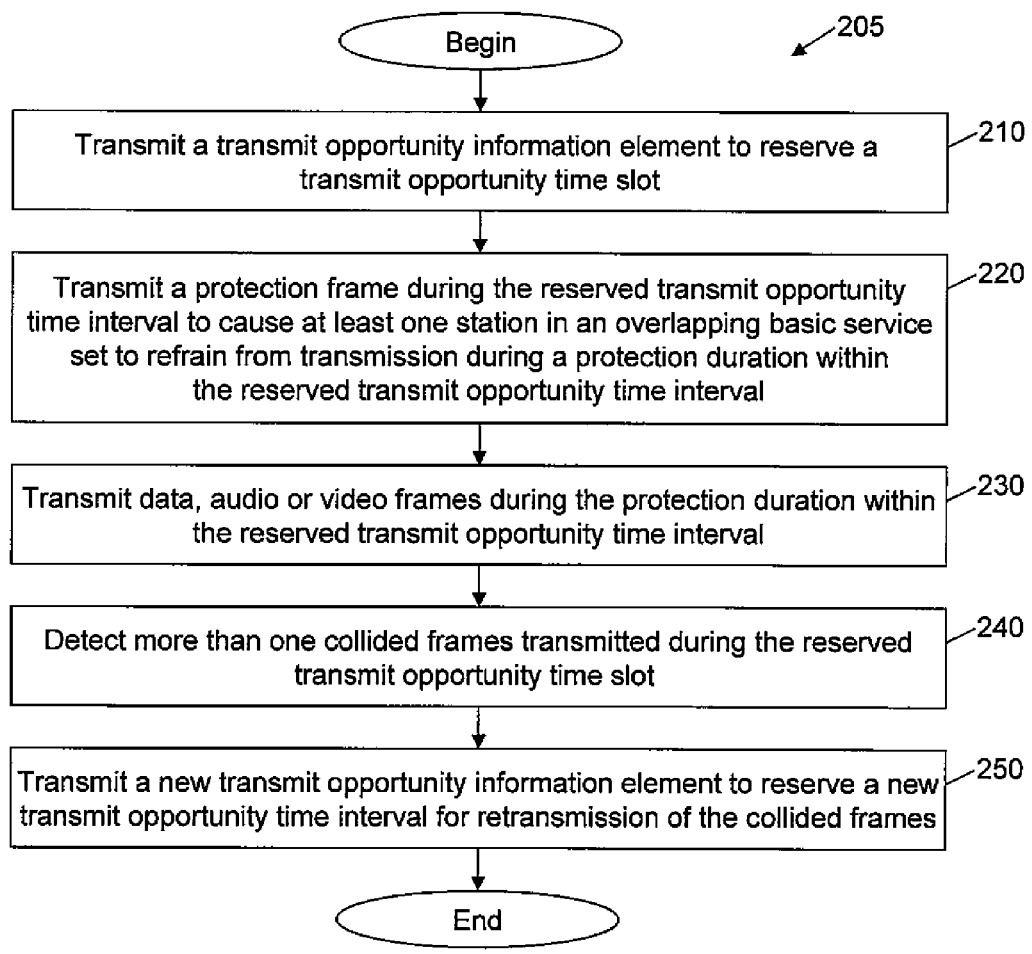
FIG. 13B is a flow chart illustrating a process of transmitting data, audio or video frames in a basic service set having a plurality of stations in the presence of an overlapping basic service set in a WLAN according to another embodiment.

FIG. 13B illustrates a process 205 of transmitting data, audio or video frames in a basic service set having a plurality of stations in the presence of an overlapping basic service set in a WLAN according to another embodiment. At 210, a TXOP information element is transmitted to reserve a TXOP time interval. At 220, a protection frame is transmitted during the reserved TXOP time interval to cause at least one station in the overlapping basic service set to refrain from transmission during a protection duration within the reserved TXOP time interval. At 230, the data, audio or video frames are transmitted during the protection duration within the reserved TXOP time interval. At 240, more than one collided frames transmitted are detected during the reserved TXOP time interval. At 250, a new TXOP information element is transmitted to reserve a new TXOP time interval for retransmission of the collided frames.

Figure 14A:
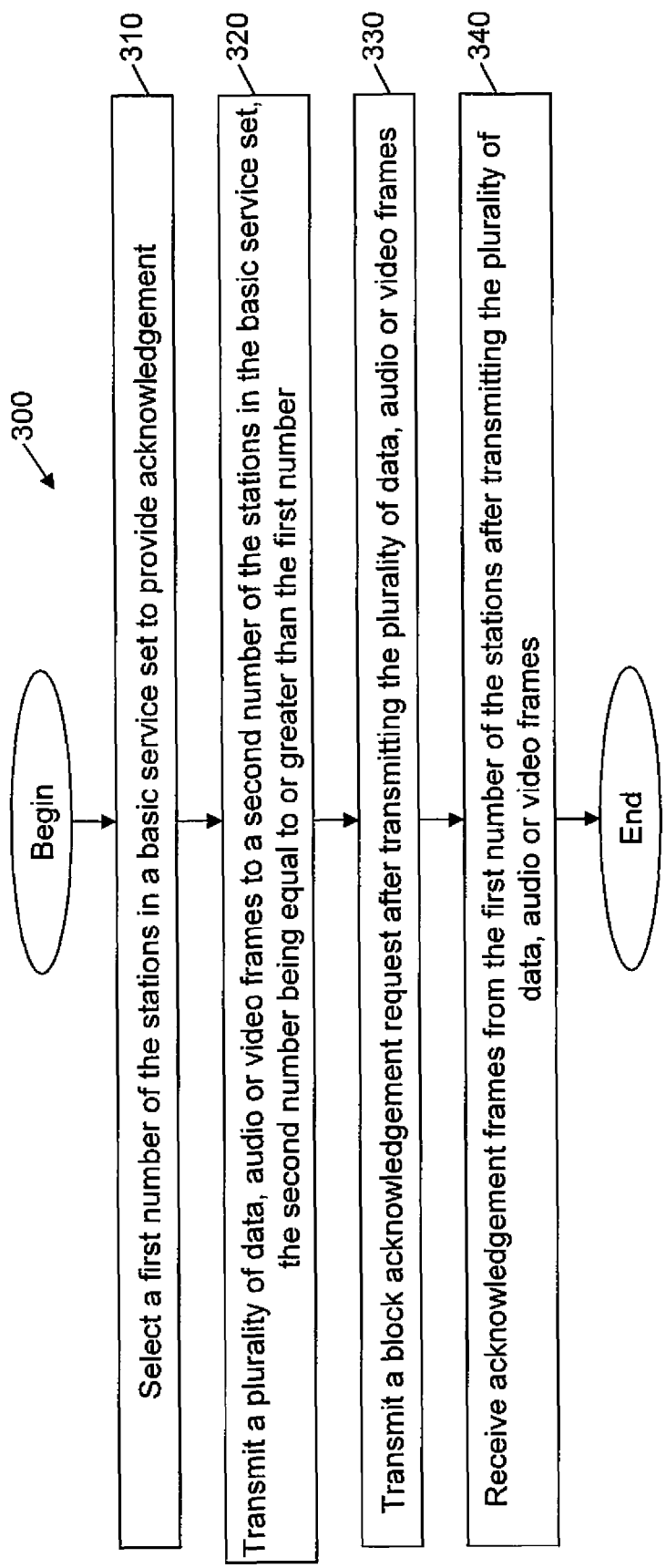
FIG. 14A is a flow chart illustrating a process of transmitting data, audio or video frames in a reserved or non-reserved transmit opportunity in a basic service set having an access point and a plurality of stations with or without the presence of an overlapping basic service set in a WLAN according to one embodiment.

FIG. 14A illustrates a process 300 of transmitting data, audio or video frames in a reserved or non-reserved transmit opportunity in a basic service set having an access point and a plurality of stations with or without the presence of an overlapping basic service set in a WLAN according to one embodiment. At 310, a first number of the stations in the basic service set are selected to provide acknowledgement. At 320, a plurality of data, audio or video frames are transmitted to a second number of the stations in the basic service set, the second number being equal to or greater than the first number. At 330, a block acknowledgement request is transmitted after transmitting the plurality of data, audio or video frames. At 340, acknowledgement frames from the first number of the stations are received after the plurality of data, audio or video frames are transmitted. In one embodiment, transmitting the block acknowledgement request may include transmitting a multicast or broadcast block acknowledgement request from the access point to the first number of the stations to request each of the first number of the stations to respond with a respective acknowledgement frame. The multicast or broadcast block acknowledgement request may include a respective identifier of each of the first number of the stations, a respective offset for each of the first number of the stations to transmit the respective acknowledgement frame at a time from a reference time by the respective offset, and a duration for transmission of the respective acknowledgement frame. In an alternative embodiment, transmitting the block acknowledgement request may include setting a reserved field in a block acknowledgement frame based on the IEEE 802.11 standards to indicate the block acknowledgement frame as being a multicast or broadcast block acknowledgement frame; and transmitting the block acknowledgement from the access point to the first number of the stations.

Figure 14B:
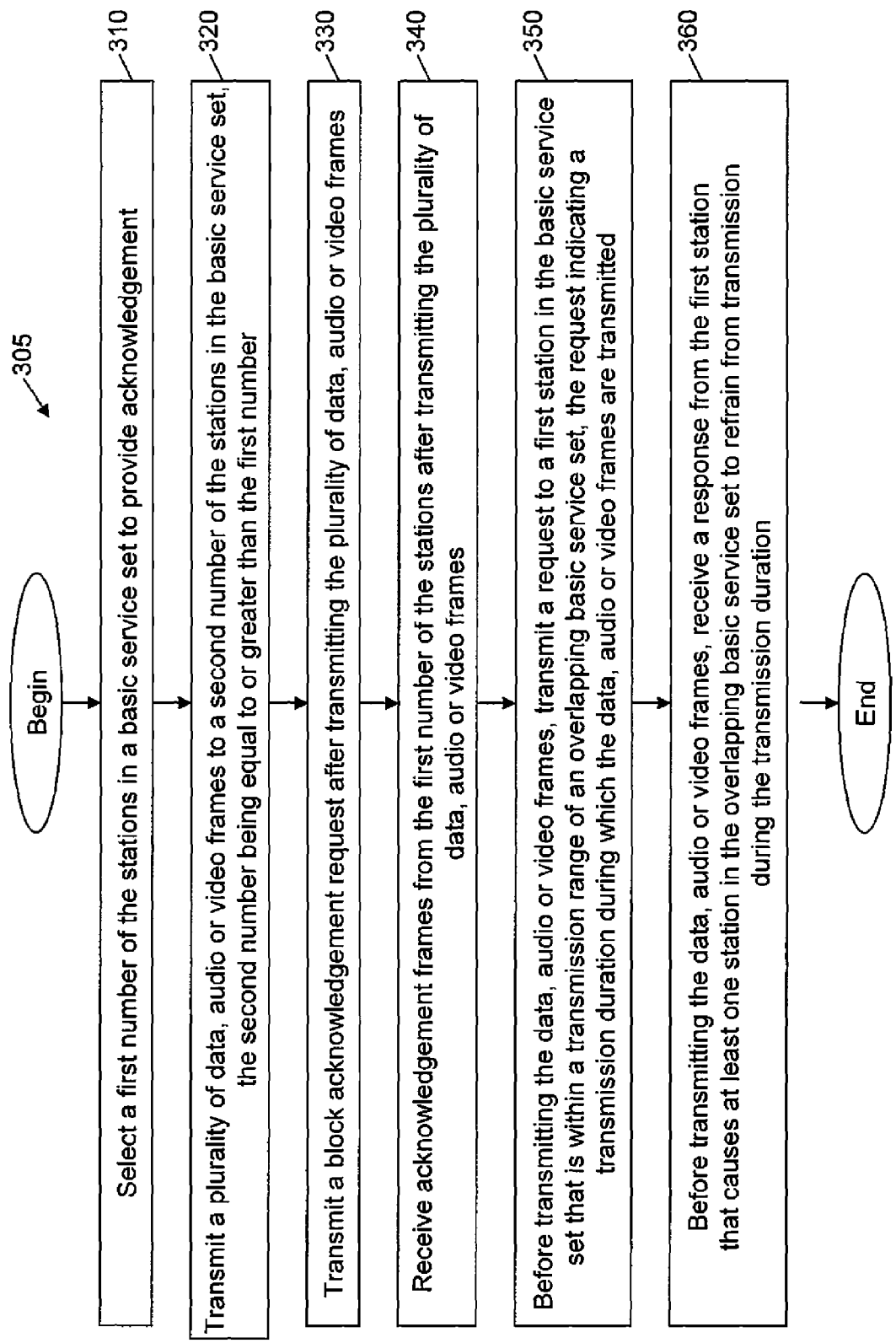
FIG. 14B is a flow chart illustrating a process of transmitting data, audio or video frames in a reserved or non-reserved transmit opportunity in a basic service set having an access point and a plurality of stations with or without the presence of an overlapping basic service set in a WLAN according to another embodiment.

FIG. 14B illustrates a process 305 of transmitting data, audio or video frames in a reserved or non-reserved transmit opportunity in a basic service set having an access point and a plurality of stations with or without the presence of an overlapping basic service set in a WLAN according to another embodiment. At 310, a first number of the stations in the basic service set are selected to provide acknowledgement. At 320, a plurality of data, audio or video frames are transmitted to a second number of the stations in the basic service set, the second number being equal to or greater than the first number. At 330, a block acknowledgement request is transmitted after transmitting the plurality of data, audio or video frames. At 340, acknowledgement frames from the first number of the stations are received after the plurality of data, audio or video frames are transmitted. At 350, before transmitting the data, audio or video frames, a request is transmitted to a first station in the basic service set that is within a transmission range of the overlapping basic service set, the request indicating a transmission duration during which the data, audio or video frames are transmitted. At 360, before transmitting the data, audio or video frames, a response is received from the first station that causes at least one station in the overlapping basic service set to refrain from transmission during the transmission duration. In one embodiment, the request may include a request-to-send frame, and the response may include a clear-to-send frame. In an alternative embodiment, the request may include a multicast or broadcast block acknowledgement request frame, and the response may include a multicast or broadcast block acknowledgement frame.

Figure 15A:
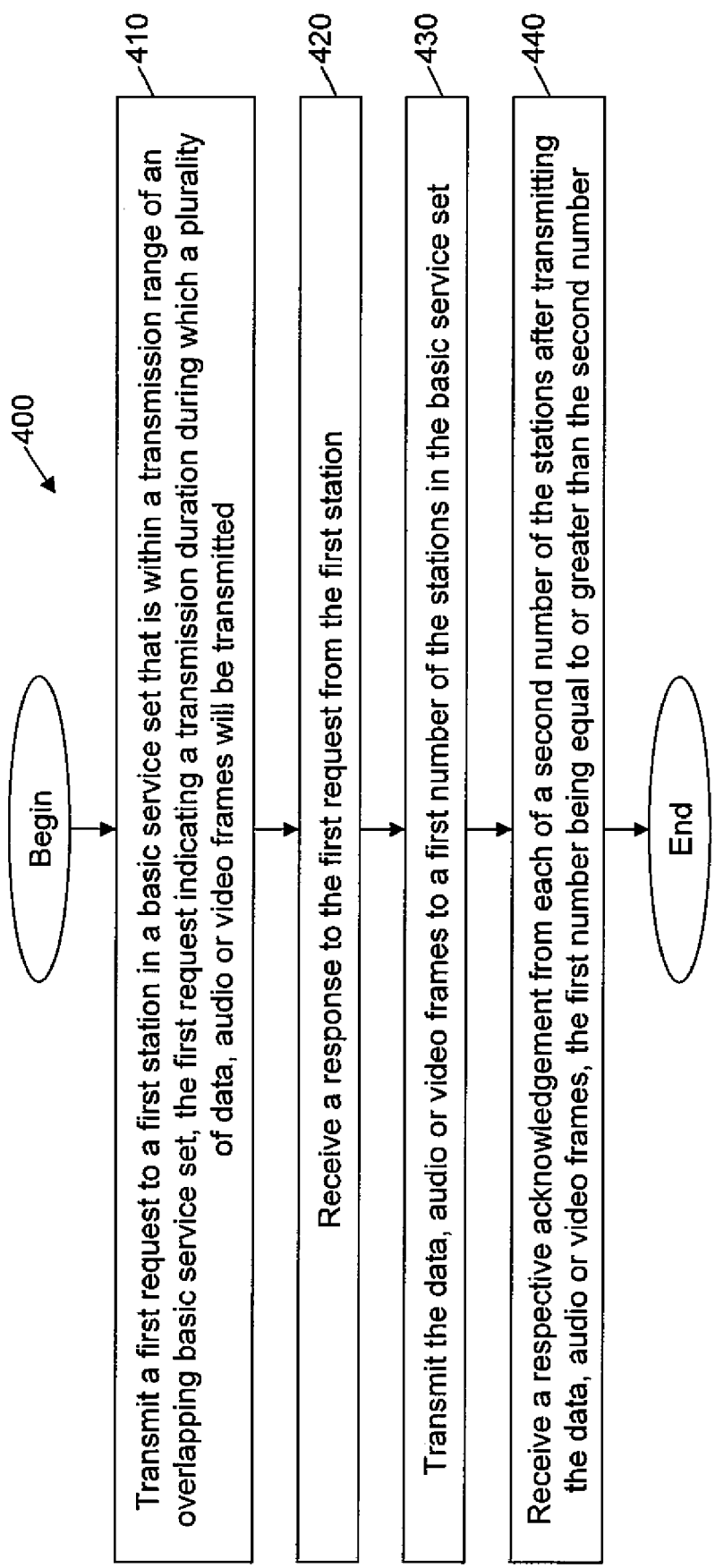
FIG. 15A is a flow chart illustrating a process of transmitting data, audio or video frames in a reserved or non-reserved transmit opportunity in a basic service set having a plurality of stations in the presence of an overlapping basic service set in a WLAN according to a further embodiment.

FIG. 15A illustrates a process 400 of transmitting data, audio or video frames in a reserved or non-reserved transmit opportunity in a basic service set having a plurality of stations in the presence of an overlapping basic service set in a WLAN according to a further embodiment. At 410, a first request is transmitted to a first station in the basic service set that is within a transmission range of the overlapping basic service set, the first request indicating a transmission duration during which a plurality of data, audio or video frames will be transmitted. At 420, a response to the first request is received from the first station. At 430, the data, audio or video frames are transmitted to a first number of the stations in the basic service set. At 440, a respective acknowledgement is received from each of a second number of the stations after transmitting the data, audio or video frames, the first number being equal to or greater than the second number. In one embodiment, the first request may include a request-to-send frame, and the response may include a clear-to-send frame.

Figure 15B:
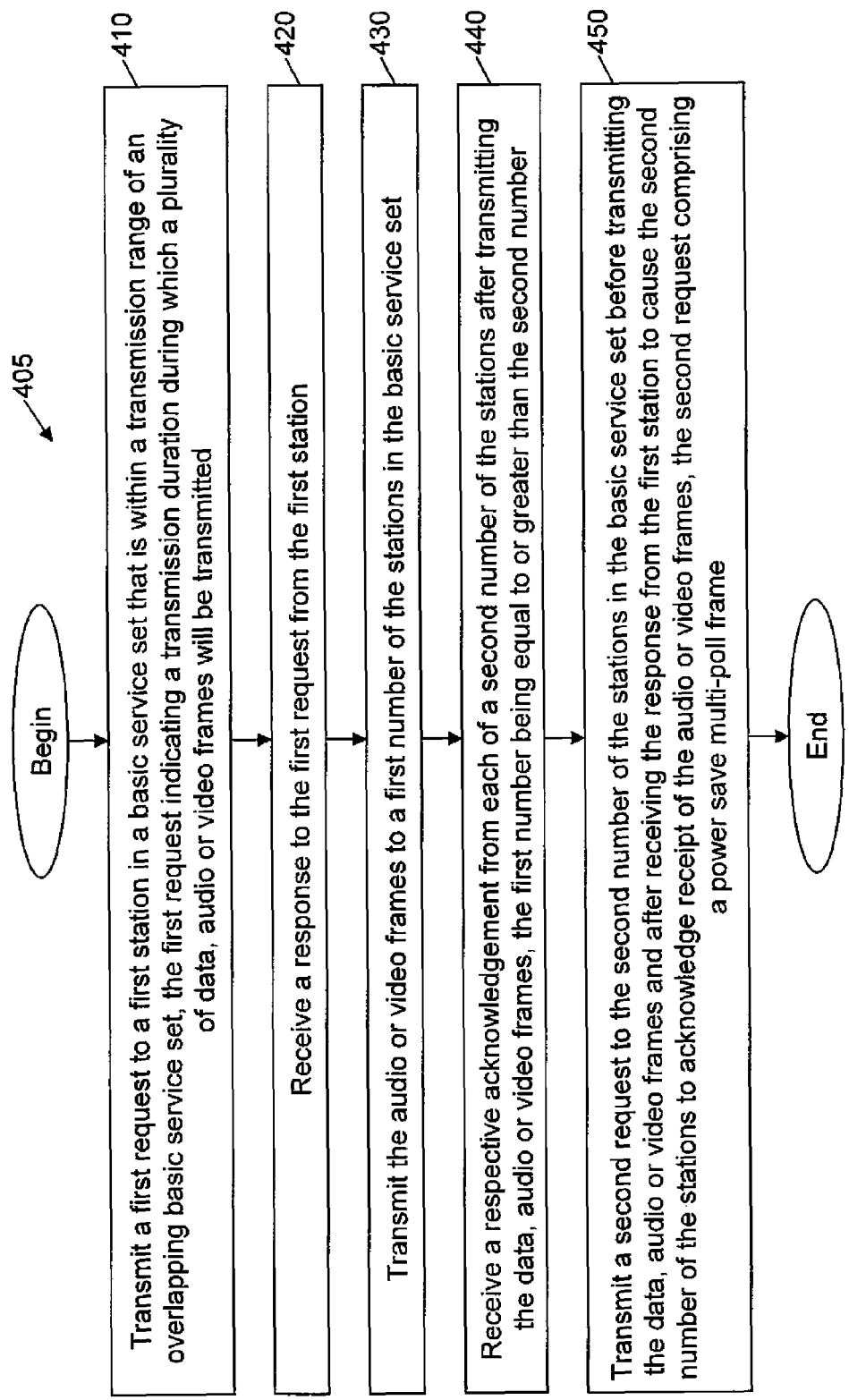
FIG. 15B is a flow chart illustrating a process of transmitting data, audio or video frames in a reserved or non-reserved transmit opportunity in a basic service set having a plurality of stations in the presence of an overlapping basic service set in a WLAN according to yet another embodiment.

FIG. 15B illustrates a process 405 of transmitting data, audio or video frames in a reserved or non-reserved transmit opportunity in a basic service set having a plurality of stations in the presence of an overlapping basic service set in a WLAN according to yet another embodiment. At 410, a first request is transmitted to a first station in the basic service set that is within a transmission range of the overlapping basic service set, the first request indicating a transmission duration during which a plurality of data, audio or video frames will be transmitted. At 420, a response to the first request is received from the first station. At 430, the data, audio or video frames are transmitted to a first number of the stations in the basic service set. At 440, a respective acknowledgement is received from each of a second number of the stations after transmitting the data, audio or video frames, the first number being equal to or greater than the second number. At 450, a second request is transmitted to the second number of the stations in the basic service set before transmitting the data, audio or video frames and after receiving the response from the first station to cause the second number of the stations to acknowledge receipt of the data, audio or video frames, the second request including a power save multi-poll frame.

Figure 16:
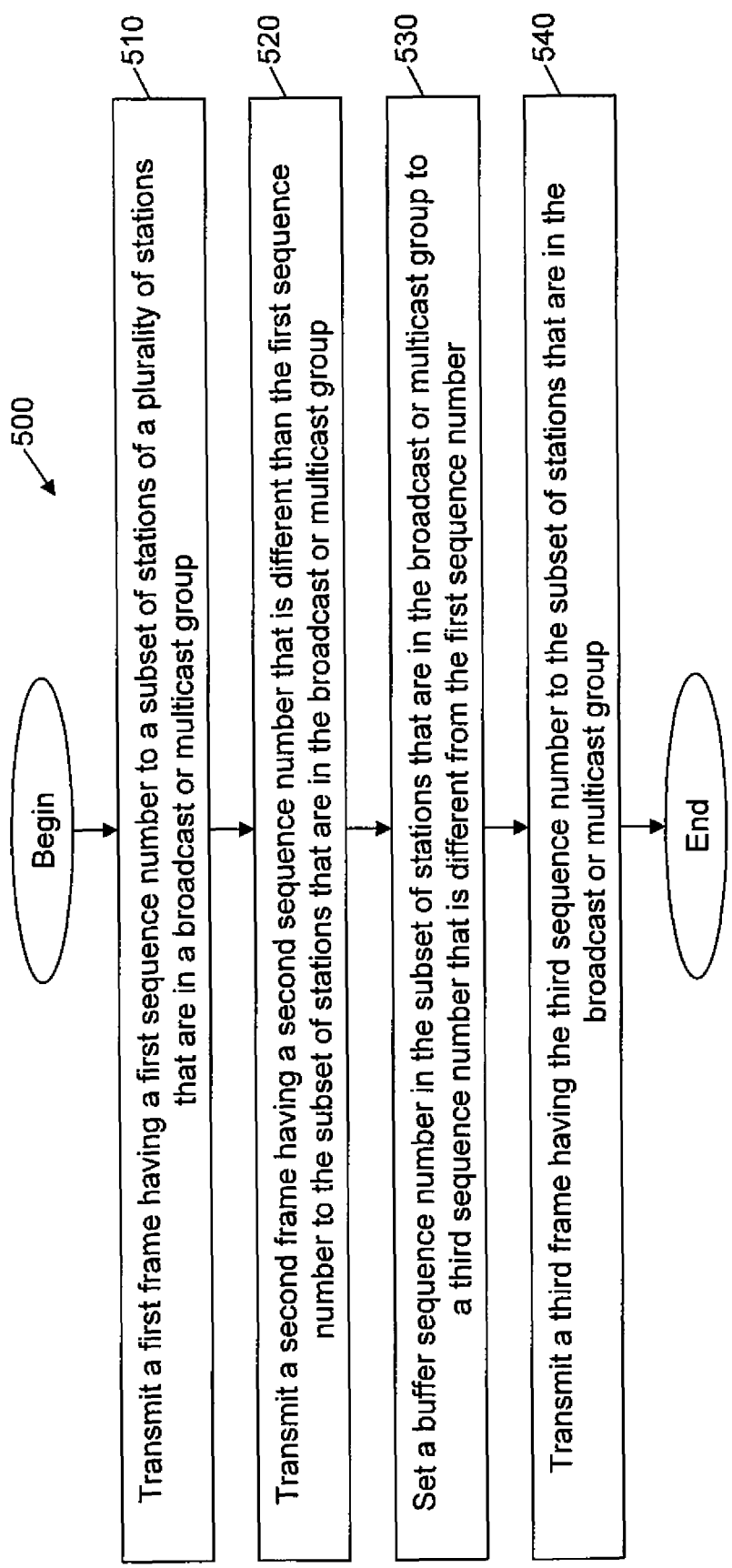
FIG. 16 is a flow chart illustrating a process of transmitting data, audio or video frames in a reserved or non-reserved transmit opportunity in a basic service set having a plurality of stations in a WLAN according to a further embodiment.

FIG. 16 illustrates a process 500 of transmitting data, audio or video frames in a reserved or non-reserved transmit opportunity in a basic service set having a plurality of stations in a WLAN according to a further embodiment. At 510, a first frame having a first sequence number is transmitted to at least a subset of stations of the plurality of stations that are in a broadcast or multicast group. At 520, a second frame having a second sequence number is transmitted to at least the subset of stations that are in the broadcast or multicast group. The second sequence number may be larger than the first sequence number, for example, and the second sequence number may be used to pass the sequence number allocated to management frames. This can help the stations in the broadcast or multicast group to each release its BlockAck receiving buffer. At 530, a buffer sequence number in the subset of stations that are in the broadcast or multicast group are set to a third sequence number. The third sequence number may be the same as the second sequence number or equal to the second sequence number plus 1, for example. At 540, a third frame having a third sequence number is transmitted to the subset of stations that are in the broadcast or multicast group. In one embodiment, setting the buffer sequence number in the subset of stations in the broadcast or multicast group to the third sequence number may include firstly transmitting one of a block acknowledgement request frame, a multicast or broadcast block acknowledgement frame, and a multiple traffic block acknowledgement frame to the subset of stations in the broadcast or multicast group, and secondly transmitting one of a block acknowledgement request frame, a multicast or broadcast block acknowledgement frame, and a multiple traffic block acknowledgement frame to the subset of stations in the broadcast or multicast group to set the buffer sequence number in the subset of stations in the broadcast or multicast group to the third sequence number.

Figure 17:
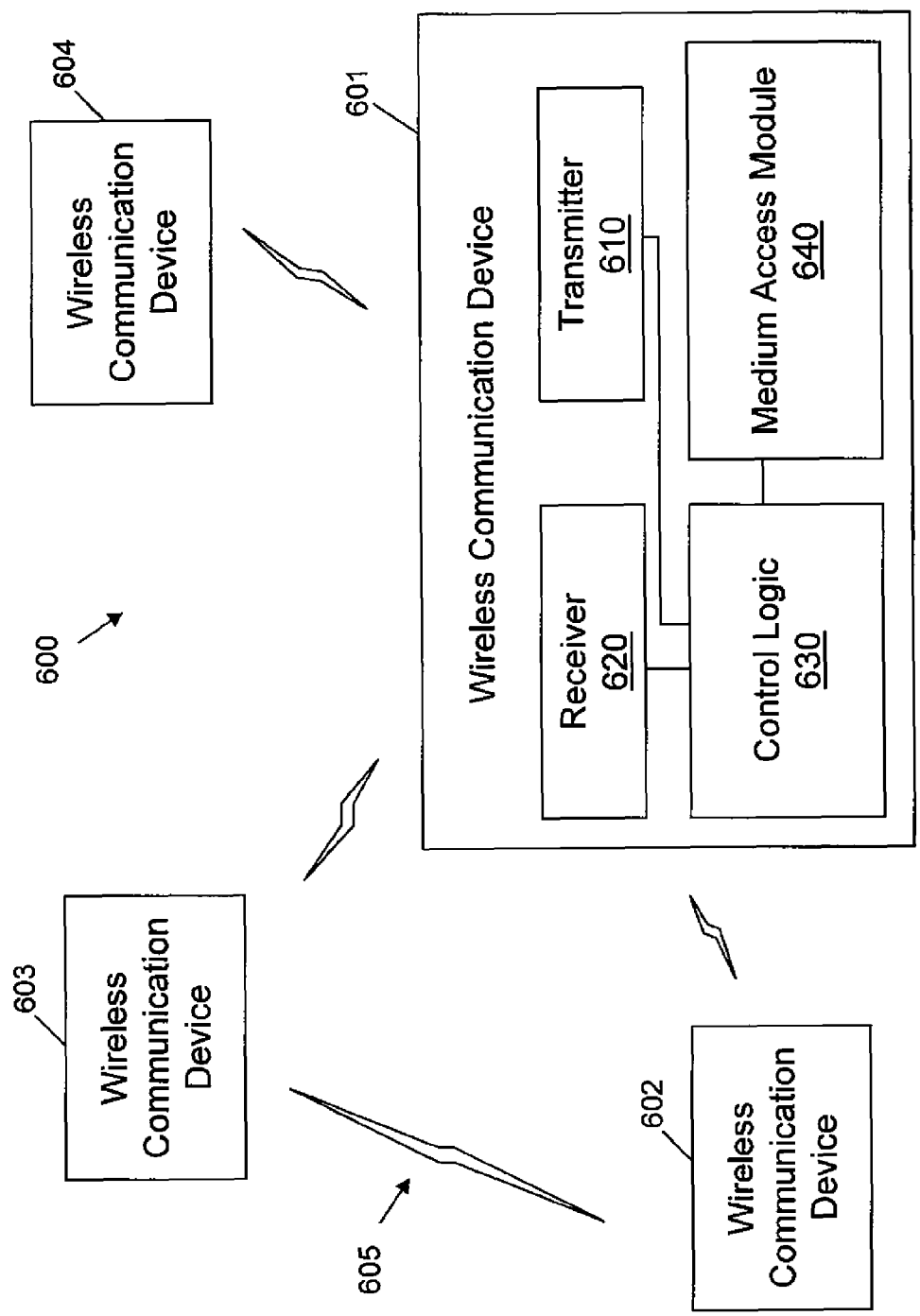
FIG. 17 is a simplified block diagram of a wireless communication device in a basic service set in a WLAN according to one embodiment.

FIG. 17 illustrates a wireless communication device 601 in a basic service set 600 in a WLAN according to one embodiment. The basic service set 600 includes the wireless communication device 601 and other wireless communication devices 602, 603, and 604. Although a total of four wireless communication devices are illustrated, it should be understood that a basic service set can have a different number of wireless communication devices. In one embodiment, the wireless communication device 601 includes a transmitter 610, a receiver 620, and a control logic 630 coupled to the transmitter 610 and the receiver 620 to control operations of the transmitter 610 and the receiver 620.

The wireless communication device 601 also includes a medium access module 640 coupled to the control logic 630. The medium access module 640 is configured to cause a TXOP information element to be transmitted to reserve a TXOP time interval for transmission of data, audio or video frames. The medium access module 640 causes the data, audio or video frames to be transmitted during the reserved TXOP time interval or a non-reserved TXOP time interval. In the event of a two-stage TXOP, the medium access module 640 causes a protection frame to be transmitted to indicate a protection duration within the reserved TXOP time interval to cause at least one of the wireless communication devices 602, 603 and 604 to refrain from transmission during the protection duration. The medium access module 640 then causes the data, audio or video frames to be transmitted during the protection duration.

In one embodiment, the reserved TXOP information element transmitted by the wireless communication device 601 includes at least one of the following fields: active indication to indicate whether or not the TXOP is currently enabled, an activation start time to indicate a time when the TXOP will be enabled if the TXOP is not currently enabled, a TXOP type, a source address, a destination address, a service interval, an offset to the service interval, and duration of the TXOP. In another embodiment, the wireless communication device 601 transmits a control frame as a protection frame that includes a duration field set to a protection duration to prohibit an overlapping basic service set from transmitting during the protection duration. In yet another embodiment, the wireless communication device 601 may contend for medium access right using the AC_VO access category of the EDCA protocol to transmit the video frames.

The wireless communication devices 601, 602, 603, and 604 may communicate with each other via the transmission medium 605 according to the IEEE 802.11 standards including the protocols defined in the IEEE 802.11e amendment or the enhanced IEEE 802.11e amendment, such as 802.11n and further amendment. In one embodiment, one or more of the wireless communication devices 602, 603, and 604 is structurally and functionally the same as the wireless communication devices 601. In another embodiment, one or more of the wireless communication devices 602, 603, and 604 is structurally and/or functionally different from the wireless communication devices 601. In one embodiment, the wireless communication devices 601 assigns the wireless communication device 602 to broadcast the protection frame when a first overlapping basic service set (not shown) is present, if the wireless communication device 602 is within a transmission range of the first overlapping basic service set. The wireless communication devices 601 may additionally assign the wireless communication device 603 to broadcast the protection frame when a second overlapping basic service set (not shown) is present, if the wireless communication device 603 is within a transmission range of the second overlapping basic service set.

Thus, embodiments of an inventive scheme to implement a reservation-based medium access method to provide reliable data, audio or video transmission and deterministic delay have been disclosed. Further, embodiments of an inventive scheme to provide reliable data, audio or video transmission in a non-reservation-based TXOP time interval have also been disclosed. The implementation scheme according to the various embodiments disclosed herein provides several advantages over the conventional implementation of transmission of video frames. For instance, a reserved video TXOP is broadcasted to stations within a basic service set to reserve a TXOP for transmission of broadcast or multicast video frames. When an overlapping basic service set is present, a two-stage TXOP is implements. Otherwise, a one-stage TXOP is implemented. The use of acknowledgement further contributes to reliable communication. There is no physical layer modification necessary to implement the proposed scheme. Inter-OBSS interference can be avoided, including interference by a legacy overlapping basic service set. Reliable broadcast/multicast transmission and deterministic delay can thus be achieved.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other context, not necessarily the exemplary context of transmission of video frames generally described above. It will be understood by those skilled in the art that, although the embodiments described above and shown in the figures are generally directed to the context of transmission of video frames, applications related to transmission of high-priority frames other than video frames, for example, may also benefit from the concepts described herein.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method of transmitting data, audio or video frames in a basic service set having a plurality of stations in a wireless local area network, at least one of the plurality of stations included in an overlapping basic service set, the method comprising:
   transmitting a transmit opportunity information element to reserve a transmit opportunity time interval;
   directing the at least one of the plurality of stations in the overlapping basic service set to broadcast a protection frame during the reserved transmit opportunity time interval to cause at least one wireless communication device in the overlapping basic service set to refrain from transmission during a protection duration, the protection frame including the protection duration; and
   transmitting the data, audio or video frames to a number of the stations in the basic service set during the reserved transmit opportunity time interval.

2. The method of claim 1 wherein transmitting the transmit opportunity information element comprises transmitting at least one of an active indication to indicate whether or not the transmit opportunity is currently enabled, an activation start time to indicate a time when the transmit opportunity will be enabled if the transmit opportunity is not currently enabled, a transmit opportunity type, a source address, a destination address, a service interval, an offset to the service interval, and a duration of the transmit opportunity.

3. The method of claim 1 wherein transmitting the transmit opportunity information element comprises broadcasting the transmit opportunity information element using a delivery traffic indication message (DTIM) beacon to the stations in the basic service set.

4. A method of transmitting data, audio or video frames in a basic service set having a plurality of stations in the presence of an overlapping basic service set in a wireless local area network, the method comprising:
   transmitting a transmit opportunity information element to reserve a transmit opportunity time interval;
   assigning a first station in the basic service set to transmit a protection frame during the reserved transmit opportunity time interval, the protection frame including a protection duration, the protection frame arranged to cause at least one wireless communication device in the overlapping basic service set to refrain from transmission during the protection duration within the reserved transmit opportunity time interval, the first station being within a transmission range of the overlapping basic service set; and
   transmitting the data, audio or video frames during the protection duration within the reserved transmit opportunity time interval.

5. The method of claim 4 wherein transmitting the protection frame comprises broadcasting a control frame that includes a duration field set to the protection duration.

6. The method of claim 4 wherein the protection frame is arranged
   to cause the at least one station in the overlapping basic service set to set a network allocation vector according to the IEEE 802.11 standards for the protection duration.

7. The method of claim 4, further comprising:
   detecting more than one collided frames transmitted during the reserved transmit opportunity time interval; and
   transmitting a new transmit opportunity information element to reserve a new transmit opportunity time interval for retransmission of the collided frames.

8. A method of transmitting data, audio or video frames in a reserved transmit opportunity in a basic service set having an access point and a plurality of stations with or without the presence of an overlapping basic service set in a wireless local area network, the method comprising:
   selecting a first number of the stations in the basic service set to provide acknowledgement;
   transmitting a plurality of data, audio or video frames to a second number of the stations in the basic service set, the second number being equal to or greater than the first number;
   transmitting, after transmitting the plurality of data, audio or video frames, a block acknowledgement request, the transmitting including transmitting a multicast or broadcast block acknowledgement request from the access point to the first number of the stations to request each of the first number of the stations to respond with a respective acknowledgement frame; and
   receiving acknowledgement frames from the first number of the stations after transmitting the plurality of data, audio or video frames.

9. The method of claim 8 wherein the multicast or broadcast block acknowledgement request includes a respective identifier of each of the first number of the stations, a respective offset for each of the first number of the stations to transmit the respective acknowledgement frame at a time from a reference time by the respective offset, and a duration for transmission of the respective acknowledgement frame.

10. The method of claim 8 wherein transmitting the block acknowledgement request comprises:
   setting a reserved field in a block acknowledgement frame based on the IEEE 802.11 standards to indicate the block acknowledgement frame as being a multicast or broadcast block acknowledgement frame; and
   transmitting the block acknowledgement from the access point to the first number of the stations.

11. The method of claim 8, further comprising:
   before transmitting the data, audio or video frames, transmitting a request to a first station in the basic service set that is within a transmission range of the overlapping basic service set, the request indicating a transmission duration during which the data, audio or video frames are transmitted; and before transmitting the data, audio or video frames, receiving a response from the first station that causes at least one station in the overlapping basic service set to refrain from transmission during the transmission duration.

12. The method of claim 11 wherein the request comprises a request-to-send frame, and wherein the response comprises a clear-to-send frame.

13. The method of claim 11 wherein the request comprises a multicast or broadcast block acknowledgement request frame, and wherein the response comprises a multicast or broadcast block acknowledgement frame.

14. A method of transmitting data, audio or video frames in a reserved transmit opportunity in a basic service set having a plurality of stations in the presence of an overlapping basic service set in a wireless local area network, the method comprising:

transmitting a first request to a first station in the basic service set that is within a transmission range of the overlapping basic service set, the first request indicating a transmission duration during which a plurality of data, audio or video frames will be transmitted;

receiving a response to the first request from the first station;

transmitting the data, audio or video frames to a first number of the stations in the basic service set;

receiving a respective acknowledgement from each of a second number of the stations after transmitting the data, audio or video frames, the first number being equal to or greater than the second number; and transmitting a second request to the second number of the stations in the basic service set before transmitting the data, audio or video frames and after receiving the response from the first station to cause the second number of the stations to acknowledge receipt of the data, audio or video frames, the second request comprising a power save multi-poll frame.

15. The method of claim 14 wherein the first request comprises a request-to-send frame, wherein the response comprises a clear-to-send frame.

16. A method of transmitting data, audio or video frames in a basic service set having a plurality of stations in a wireless local area network, the method comprising:

transmitting a first frame having a first sequence number to a subset of stations of the plurality of stations that are in a broadcast or multicast group;

transmitting a second frame having a second sequence number that is different than the first sequence number to at least the subset of stations;

setting a buffer sequence number in the subset of stations to a third sequence number that is different from the first sequence number;

transmitting a third frame having the third sequence number to the subset of stations; and transmitting one of a block acknowledgment request frame, a multicast or broadcast block acknowledgement frame, and a multiple traffic block acknowledgement frame to the subset of stations in the broadcast or multicast group to set the buffer sequence number in the subset of stations to the third sequence number.

17. A circuit in a wireless communication device, comprising:

a transmitter;

a medium access module configured to cause a transmit opportunity information element to be transmitted via the transmitter to reserve a transmit opportunity time interval for transmission of data, audio or video frames, and to cause the data, audio or video frames to be transmitted during the reserved transmit opportunity time interval, the medium access module is further configured to cause a protection frame to be transmitted by an assigned first station during the reserved transmit opportunity time interval to indicate a protection duration within the reserved transmit opportunity time interval, the protection frame arranged to cause at least one other wireless communication device to refrain from transmission during the protection duration, and wherein the medium access module is further configured to cause the data, audio or video frames to be transmitted during a transmission stage of the reserved transmit opportunity time interval.

* * * * *